(12) United States Patent
Barber et al.

(10) Patent No.: US 11,164,114 B2
(45) Date of Patent: Nov. 2, 2021

(54) SYSTEM AND METHOD FOR PERFORMING DETAILED PLANNING FUNCTIONS

(71) Applicant: PROPHIX SOFTWARE INC., Mississauga (CA)

(72) Inventors: Paul Barber, Mississauga (CA); Robert Walker, Mississauga (CA); Geoffrey Ng, Scarborough (CA); Jason Seeley, Bolton (CA)

(73) Assignee: TCG SENIOR FUNDING L.L.C., New York, NY (US)

( * ) Notice: Subject to any disclaimer, the term of this patent is extended or adjusted under 35 U.S.C. 154(b) by 283 days.

(21) Appl. No.: 15/825,901

(22) Filed: Nov. 29, 2017

(65) Prior Publication Data

US 2018/0082226 A1 Mar. 22, 2018

Related U.S. Application Data

(63) Continuation of application No. 13/469,318, filed on May 11, 2012, now abandoned.

(51) Int. Cl.
*G06Q 10/06* (2012.01)

(52) U.S. Cl.
CPC .................................. *G06Q 10/06* (2013.01)

(58) Field of Classification Search
None
See application file for complete search history.

(56) References Cited

U.S. PATENT DOCUMENTS

| | | |
|---|---|---|
| 6,317,750 B1 | 11/2001 | Tortolani et al. |
| 6,460,059 B1 | 10/2002 | Wisniewski |
| 6,480,842 B1 | 11/2002 | Agassi et al. |

(Continued)

FOREIGN PATENT DOCUMENTS

EP 1308852 A1 * 5/2003 ........... G06F 16/283

OTHER PUBLICATIONS

Singh, M. et al. An Analytics Approach for Proactively Combating Voluntary Attrition of Employees. 2012 IEEE 12th International Conference on Data Mining Workshops (pp. 317-323). (Year: 2012).*

(Continued)

*Primary Examiner* — Patricia H Munson
*Assistant Examiner* — Nancy N Prasad
(74) *Attorney, Agent, or Firm* — Tarolli, Sundheim, Covell & Tummino LLP

(57) ABSTRACT

A system, method and computer program product for performing detailed planning functions for businesses, enterprises and other types of organizations. According to an embodiment, the system comprises a graphical user interface configured to allow a user to define calculations based on data associated with an entity that may have scalar attributes for each entity, and/or a time series, and execution of the defined calculation generates time series result. According to another aspect, a calculation definition may be configured to be adjustable allowing a user to adjust parameter value(s) for each entity associated with the calculation definition. According to another aspect, a calculation definition may be configured to be discretionary allowing a user to attach or assign a calculation to each entity individually. According to another aspect, multiple calculations may be created and have the same name.

17 Claims, 48 Drawing Sheets

(56) References Cited

U.S. PATENT DOCUMENTS

| | | | |
|---|---|---|---|
| 6,707,454 | B1 | 3/2004 | Barg et al. |
| 6,768,986 | B2 | 7/2004 | Cras et al. |
| 6,931,418 | B1 | 8/2005 | Barnes |
| 6,938,240 | B2 | 8/2005 | Charisius |
| 6,968,343 | B2 | 11/2005 | Charisius et al. |
| 2002/0077842 | A1 | 6/2002 | Charisius et al. |
| 2002/0078432 | A1 | 6/2002 | Charisius et al. |
| 2002/0107914 | A1 | 8/2002 | Charisius et al. |
| 2002/0184260 | A1 | 12/2002 | Martin et al. |
| 2003/0061225 | A1 | 3/2003 | Bowman et al. |
| 2003/0195898 | A1 | 10/2003 | Agarwal et al. |
| 2004/0193598 | A1 | 9/2004 | Kan et al. |
| 2005/0091206 | A1 | 4/2005 | Koukerdjinian et al. |
| 2006/0271841 | A1 | 11/2006 | Thanu et al. |
| 2007/0118501 | A1 | 5/2007 | Yan |
| 2008/0041942 | A1* | 2/2008 | Aissa .................. G06Q 20/341 235/382 |
| 2008/0294680 | A1 | 11/2008 | Powell et al. |
| 2009/0240607 | A1* | 9/2009 | Shortridge ............. G06Q 10/06 705/30 |
| 2010/0042518 | A1* | 2/2010 | Handa ................... G06Q 40/12 705/30 |
| 2010/0100427 | A1* | 4/2010 | McKeown ......... G06Q 10/1057 705/322 |
| 2011/0282704 | A1* | 11/2011 | Graeber ................ G06Q 10/06 705/7.11 |

OTHER PUBLICATIONS

Microsoft Office 2003, Wikipedia, http://en.wikipedia.org/wiki/Office_2003,pp. 4, retrieved on Apr. 6, 2011.

Clarify and emphasize data in an Excel chart, Microsoft, http://office.microsoft.com/en-us/excel-help/clarify-and-emphasize-data-in-an-excel-chart-HA001034608,aspx,pp. 4, retrieved on Mar. 29, 2011.

Edit cell contents, Microsoft, http://office.microsoft.com/en-us/excel-help/edit-cell-contents-HP005199972.aspx,pp. 2, retrieved on Apr. 6, 2011.

Subtract numbers, Microsoft, http://office.microsoft.com/en-us/excel-help/subtract-numbers-HP003056140.aspx?CTT=1,pp. 2, retrieved on Apr. 6, 2011.

Election/Restriction Requirement for related U.S. Appl. No. 13/469,318 dated Apr. 24, 2013.

Non-Final Office Action for related U.S. Appl. No. 13/469,318, dated Oct. 22, 2013.

Non-Final Office Action for related U.S. Appl. No. 13/469,318 dated Aug. 12, 2014.

Final Office Action for related U.S. Appl. No. 13/469,318 dated May 20, 2015.

Non-Final Office Action for related U.S. Appl. No. 13/469,318 dated Feb. 17, 2016.

Non-Final Office Action for related U.S. Appl. No. 13/469,318 dated Sep. 23, 2016.

* cited by examiner

| Name | ID | Scenario | Calculation Type | Comments |
|---|---|---|---|---|
| Anniversary COLA Increase | | | | |
|   Anniversary COLA Increase | 73 | All Scenarios | Anniversary Increase | |
| Base Salary | | | | |
|   Base Salary | 43 | All Scenarios | Spread Data | Monthly salary |
|   Base Salary | 44 | All Scenarios | Formula | Full time monthly hourly salary |
| Car Allowance | | | | |
|   Car Allowance | 54 | All Scenarios | Input | Car allowance for selected sales team members |
| Cell Phone Allowance | | | | |
|   Cell Phone Allowance | 45 | Plan - Scenario 1 | Input | |
| Employee Retirement Contributions | | | | |
|   Employee Retirement Contributions | 56 | All Scenarios | Formula | Employees hired before restructuring |
|   Employee Retirement Contributions | 57 | All Scenarios | Formula | Employees hired after restructuring |
| FICA Tax | | | | |
|   FICA Tax | 46 | Plan - Scenario 1 | Tax | |
| Headcount | | | | |
|   Headcount | 63 | All Scenarios | Input | |
| Health Care Premiums | | | | |
|   Health Care Premiums | 72 | All Scenarios | Lookup | |
| MBO Bonus | | | | |
|   MBO Bonus | 49 | All Scenarios | Formula | |

| Profile | Summary | Actions | Discretionary | Adjustable | Input | Allocations |

Reporting Category View ▾

Start Period: March  
End Period: February 2007  2008  2009  2010  2011  2012  2013

2500

| Calculation | ID | Total | (2012M03) March | (2012M04) April | (2012M05) May | (2012M06) June | (20 |
|---|---|---|---|---|---|---|---|
| Base Salary | 43 | | | | | | |
| MBO Bonus | 49 | | | | | | |
| Salary Adjustment | 59 | | | | | | |
| Standard COLA Increase | 60 | | | | | | |
| Earnings Total | | .00 | .00 | .00 | .00 | .00 | |
| Employee Retirement Contributions | 57 | | | | | | |
| Health Care Premiums | 72 | 1600 | 0 | 0 | 200 | 200 | |
| Benefits Total | | 1,600.00 | .00 | .00 | 200.00 | 200.00 | |
| FICA Tax | 46 | | | | | | |
| Tax Total | | .00 | .00 | .00 | .00 | .00 | |
| Headcount | 63 | 12 | 1 | 1 | 1 | 1 | |
| Other Total | | 12.00 | 1.00 | 1.00 | 1.00 | 1.00 | |
| MBO Objectives Payout % | 48 | 1200% | 100% | 100% | 100% | 100% | |
| MBO Payout Amounts By Role | 58 | | | | | | |
| SUTA Rates | 42 | 84.00% | 7.00% | 7.00% | 7.00% | 7.00% | |
| Total Salary | 50 | | | | | | |
| Years of Service | 55 | 0.00 | 0.00 | 0.00 | 0.00 | 0.00 | |
| Expenses Total | | n/a | n/a | n/a | n/a | n/a | |
| Hours Total | | n/a | n/a | n/a | n/a | n/a | |

FIG. 25

Discretionary Calculations

Calculation Types

There are currently 14 types of calculation.

| Calculation | ID | Total | (2012M01) January | (2012M02) February | (2012M03) March | (2012M04) April | (2012M05) May |
|---|---|---|---|---|---|---|---|
| Base Salary | 43 | 160,000 | 13,333 | 12,121 | 13,939 | 12,727 | 14,545 |
| MBO Bonus | 49 | 30,000 | 2,500 | 2,500 | 2,500 | 2,500 | 2,500 |
| Salary Adjustment | 59 | | | | | | |
| Standard COLA Increase | 60 | 2,577 | | | | 286 | 286 |
| Earnings Total | | 192,577.27 | 15,833.33 | 14,621.21 | 16,439.39 | 15,513.64 | 17,331.82 |
| | | | | | | | |
| Cell Phone Allowance | 45 | 0 | 0 | 0 | 0 | 0 | 0 |
| Employee Retirement Contributions | 56 | 3,200 | 267 | 242 | 279 | 255 | 291 |
| Health Care Premiums | 72 | 2400 | 200 | 200 | 200 | 200 | 200 |
| Benefits Total | | 5,600.00 | 466.67 | 442.42 | 479.70 | 454.55 | 490.91 |
| | | | | | | | |
| FICA Tax | 46 | 2,730 | 925 | 837 | 968 | | |
| SUTA | 61 | 2,750 | 853 | 786 | 886 | 226 | |
| Tax Total | | 5,480.00 | 1,777.67 | 1,622.76 | 1,853.74 | 225.83 | |
| | | | | | | | |
| Headcount | | | 1 | 1 | 1 | 1 | 1 |
| Other Total | | 12.00 | 1.00 | 1.00 | 1.00 | 1.00 | 1.00 |
| | | | | | | | |
| Anniversary COLA Increase | 73 | 2,016,000.00 | 168,000.00 | 168,000.00 | 168,000.00 | 168,000.00 | 168,000.00 |
| MBO Objectives Payout % | 48 | 600% | 50% | 50% | 50% | 50% | 50% |
| MBO Payout Amounts By Role | 58 | 60,000 | 5,000 | 5,000 | 5,000 | 5,000 | 5,000 |
| SUTA Rates | 42 | 86.40% | 7.20% | 7.20% | 7.20% | 7.20% | 7.20% |
| Total Salary | 50 | 192,577 | 15,833 | 14,621 | 16,439 | 15,514 | 17,332 |
| Years of Service | 55 | 168.00 | 14.00 | 14.00 | 14.00 | 14.00 | 14.00 |
| | | | | | | | |
| Expenses Total | | n/a | n/a | n/a | n/a | n/a | n/a |
| Hours Total | | n/a | n/a | n/a | n/a | n/a | n/a |

SYSTEM AND METHOD FOR PERFORMING DETAILED PLANNING FUNCTIONS

RELATED APPLICATIONS

The present invention is continuation patent application, claiming priority to Ser. No. 13/469,318, filed on 11 May 2012, the entirety of which is incorporated herein by reference.

FIELD OF THE INVENTION

The present invention relates to computer systems and more particularly, to a system and method for performing detailed planning functions for businesses and other types of organizations or enterprises.

BACKGROUND OF THE INVENTION

Businesses, commercial entities and other types of enterprises involve a variety of activities and resources. These activities often overlap in terms of resources, personnel, internal and/or external procedures, regulatory regimes, etc. For example, in the context of personnel, planning typically deals with determining future needs for employee resources according to an organization's operational and strategic demands. Personnel planning typically involves the processing and handling of many variables and different types of information. Since personnel costs have a direct impact on the bottom line of almost all organizations, personnel planning is a critical function.

Personnel planning typically involves many variables, numerous payroll calculations, and analysis of often sensitive personnel data. Similarly, other types of resources or activities associated with an organization or enterprise will require similar considerations for performing planning functions.

Accordingly, there remains a need for improvements in the art.

BRIEF SUMMARY OF THE INVENTION

The present invention is directed to a method and system for performing detailed planning functions for businesses and other types of enterprises.

According to an embodiment, the present invention comprises a system and method for performing personnel planning functions based on personnel data and/or enterprise data for determining needs and costs for personnel according to an organization's strategic and/or operational concerns.

According to one embodiment, the present invention comprises a system for defining and executing one or more calculations associated with a planning process for an entity, the system comprises: a user interface module configured for a user machine; a server being operatively coupled to the user machine and comprising a processor, and an entities module and a calculations module operatively coupled to the processor; the user interface module being operatively coupled to the processor and comprising a screen configured to be responsive to one or more inputs for defining a calculation associated with a planning process for the entity comprising processing selected data retrieved from the entities module or the calculations module; the processor comprising a calculation engine, and the calculation engine being configured to execute the calculation defined according to the user interface, and generate one or more results associated with the process definition; and the server comprising calculation results module operatively coupled to the calculation engine and configured to receive the one or more calculation results.

According to another embodiment, the present invention comprises a graphical user interface display system operatively coupled to a processor for defining a planning calculation for an entity based on data stored in an entities database and storing the planning calculation in a calculations database, the graphical user interface display system comprises: a menu-bar having a calculation definition tab configured to be responsive to an input from a user; the definition tab being configured to display a calculation definition screen in response to the user input, the calculation definition screen comprising a general definition panel and a timing configuration panel; the general definition panel comprising a calculation control configured to be responsive to a user input for selecting a calculation, a calculation type control configured to be responsive to a user input for specifying a calculation type for the selected calculation, and a target control configured to be responsive to a user input for selecting a target database for storing results associated with the calculation; the timing configuration panel comprising a start period control configured to define a start period for a time vector and an end period control configured to define an end period for the time vector.

According to another embodiment, the present invention comprises a computer-implemented method for defining a calculation associated with an entity for performing a planning process, the method comprises the steps of: selecting an entity from a plurality of entities, wherein each of the plurality of entities includes an entity record stored in an entities database module, and the entity record comprises data associated with the entity; providing a graphical user interface configured to define the calculation associated with the selected entity; defining the calculation with one or more conditional parameters; executing the calculation by applying the one or more conditional parameters to the data associated with the entity; generating a time series based result based on the execution of the calculation; and storing the time series based result in a calculated costs database.

According to another embodiment, the present invention comprises a non-transitory computer-readable storage medium with an executable program stored thereon, wherein the program instructs a microprocessor to perform the following steps: selecting an entity from a plurality of entities, wherein each of the plurality of entities includes an entity record stored in an entities database module, and the entity record comprises data associated with the entity; providing a graphical user interface configured to define the calculation associated with the selected entity; defining the calculation with one or more conditional parameters; executing the calculation by applying the one or more conditional parameters to the data associated with the entity; generating a time series based result based on the execution of the calculation; and storing the time series based result in a calculated costs database.

Other aspects and features of the present invention will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments of the present invention, and in which:

FIG. 2 is an exemplary screen shot of a detailed planning calculations screen for selecting and configuring detailed planning calculations for the system according to an embodiment of the invention;

FIG. 24 is an exemplary screen shot of an Employee Editor Profile Tab window or panel for the Calculation Editor function screen and configured for an exemplary employee, "New Programmer" according to an embodiment of the present invention;

FIG. 25 is an exemplary screen shot of an Employee Editor Summary Tab window or panel for Calculation Editor screen and configured for a "Reporting Category View" as shown according to an embodiment of the present invention;

FIGS. 26 to 31 are exemplary screen shots of an "Edit Calculation" screen or window accessed using the "Discretionary" tab on the Calculation Editor screen and configured for editing a "Car Allowance" calculation according to an embodiment of the present invention;

FIG. 40 is an exemplary screen shot of the Employee Editor Summary window accessed from the Calculation Editor screen (e.g. using the Summary Tab) and configured for showing the results of the calculation of type "Tax";

FIG. 42 is an exemplary screen shot of the "Employee Editor" window or panel showing a configuration for editing an exemplary "Standard Increase" calculation according to an embodiment of the present invention;

FIG. 43 is an exemplary screen shot of the Employee Editor Summary window accessed from the Calculation Editor screen (e.g. using the Summary Tab) and configured for showing the results of the calculation of type "Standard Increase";

FIG. 45 is an exemplary screen shot of the "Employee Editor" window or panel showing a configuration for editing an exemplary "Anniversary Increase" calculation according to an embodiment of the present invention;

FIG. 46 is an exemplary screen shot of the Employee Editor Summary window accessed from the Calculation Editor screen (e.g. using the Summary Tab) and configured for showing the results of the calculation of type "Anniversary Increase";

FIG. 48 is an exemplary screen shot of the Employee Editor Summary window accessed from the Calculation Editor screen (e.g. using the Summary Tab) and configured for showing the results of the exemplary "Health Care Premium" calculation.

Like reference numerals indicate like or corresponding elements or components in the drawings.

DETAILED DESCRIPTION OF THE EMBODIMENTS OF THE INVENTION

Figure 1:
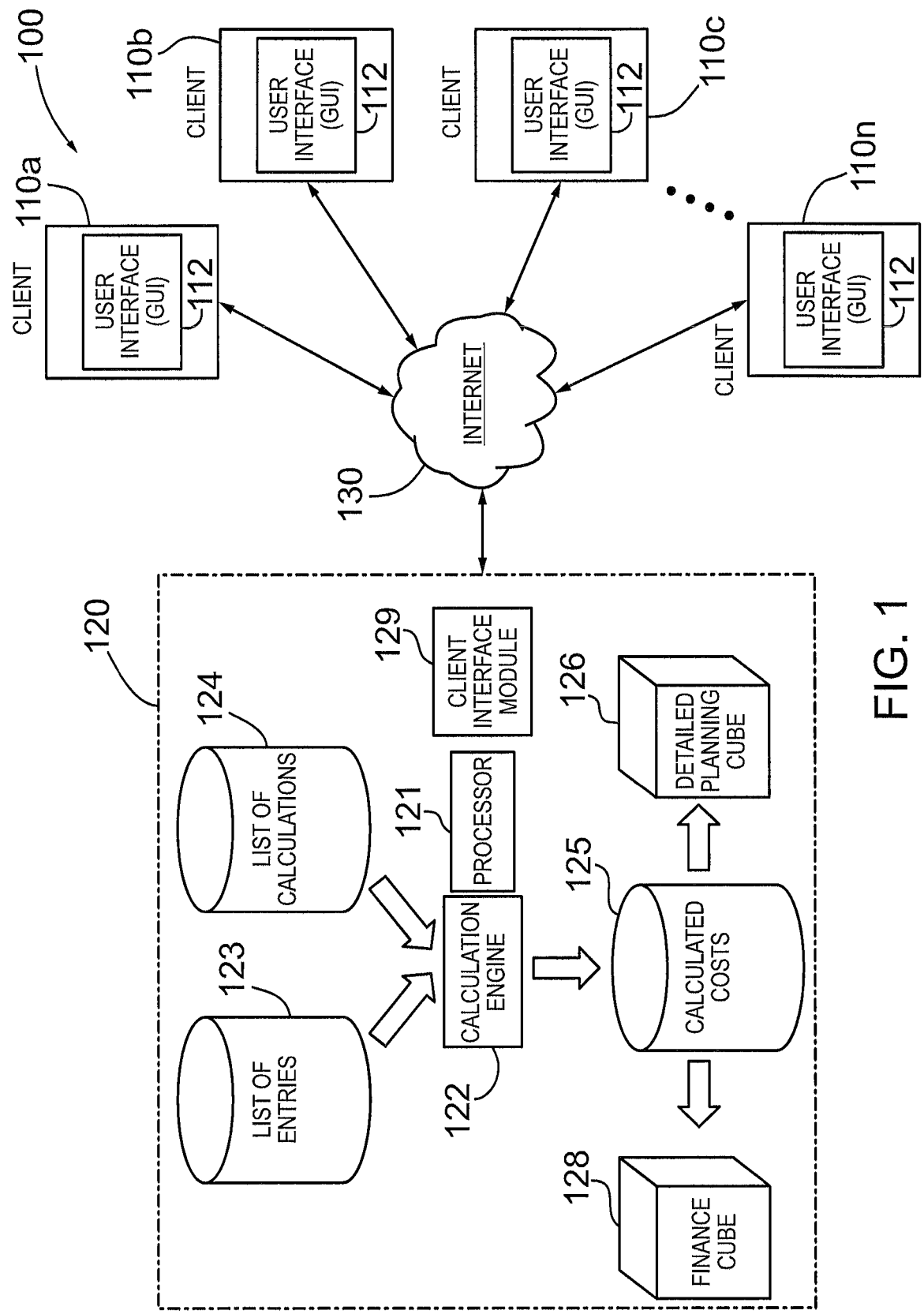
FIG. 1 shows in diagrammatic form an exemplary system for operating or executing methods or processing operations in accordance with an embodiment of the invention.

Embodiments according to the present invention are described below by way of a set of screen shots that are generated by a computer executing software or code and displayed to a user of the system. The screen shots comprise a graphical user interface and embedded logic and/or underlying processors and processing functions comprising executable computer code, objects, software and other code elements for performing or executing the functions associated with the system.

As will be described in more detail below, the present invention comprises embodiments of a computer-implemented system, method and computer program product configured for performing detailed planning functions and/ or calculations for resources associated with an enterprise, business, or other type of organization, whether for profit or non-profit. According to one aspect, the system and method are configured to provide a generalized mechanism for generating plans at a detailed level for a potentially large number of entities, and as such, may be used for determining a wide variety of intra or inter organizational planning applications. In the context of the present description, the system is described for a personnel planning application, for example, determining present or future needs for personnel according to an organization's strategic and operational demands. It will, however, be appreciated and understood that embodiments according to the present invention have wider applicability to other implementations and/or resource planning applications.

According to one aspect, the invention comprises a system and method configured for setting up calculations related to or associated with functions, operations, reporting or other activities for an enterprise, organization or other type of entity. A calculation is assigned a name in the system and comprises a time range scope, and may also include one or more conditions that relate to the entity or an individual in the entity (e.g. employees of a software company who are programmers and are paid on an hourly basis). According to another aspect, the time scope may be restricted for selected entities, for example, the Benefit premium calculations are delayed or lagged by three months for new employees, as will be described in more detail below. According to another aspect, the name assigned to calculations can be the same and are differentiated at a system level based on the entity (e.g. employee) or other parameters, as described in more detail below. According to another aspect, the system is configured with a pre-defined set of parameters, and the values of the parameters are user-definable or modifiable. According to one aspect and in the context of a personnel detailed planning application, the parameter values comprise scalar quantities (e.g. entity attributes, such as, "Annual Salary" or numerical values, such as "60,000"), or time series (e.g. other calculations, such as, "Quarterly Bonus", or inputs that vary by employee, such as, "Shifts Worked", or global vectors, such as, "Working Days per Month", which comprises a customer-defined time series that does not vary by employee. According to another aspect, a parameter for a calculation may comprise another calculation, and the system is configured to make the calculation on the basis of the calculation names. According to another aspect, the system comprises logic configured to execute calculations that are not user-definable. The calculations are executed based on the parameter settings, and according to an implementation, the calculation result comprises a time series.

In accordance with embodiments of the present invention, a system and techniques or methods (e.g. computer-implemented processes) are described in more detail below for performing a variety of planning functions and/or calculations based on data stored and/or accessed from one or more relational databases or tables and/or one or more OLAP databases (e.g. "cubes").

Reference is first made to FIG. 1, which shows in diagrammatic form an exemplary operating environment and configuration for implementing and practising a system and processes according to embodiments of the present invention. The operating environment according to an embodiment and indicated generally by reference 100 comprises a client/server configuration. As shown, one or more clients 110, indicated individually by references 110a, 110b, 110c, . . . , 110n, access a server indicated by reference 120, for example, through a network 130. As shown, the server 120 comprises a processor indicated generally by reference 121, a calculation engine 122, an entities module 123, a calculations module 124, a calculated costs module 125, a detailed planning module 126 and a financial data module 128. The processor 121 comprises one or more computer devices that are configured in known manner to execute computer programs, software, objects or code, and perform or provide the functions, operations and features, as described in more detail herein. The server 120 includes a calculation engine module 122, which may comprise a separate computer, computing device or processor configured to execute or perform (i.e., operating under stored program control, e.g. a computer program or software stored on a computer readable media or medium) the functions and operations as described in more detail below, or may comprise a component or module of the processor 121 and configured to execute or perform the functions and/or operations, as described in more detail below. The calculation engine 122 is configured to operate either on individual entities or on multiple entities, and the calculations or operations are performed for the relevant entities based on the conditional nature of the calculations, as described in more detail below.

Referring still to FIG. 1, the entities module 123 comprises a table or a view that includes a record for each entity for which planning functions or calculations are to be performed (for example, "Employees"). The entities module 123 is configured or implemented in a computer-readable medium comprising a storage media or other non-volatile memory or device. According to an exemplary implementation, each entity may include associated scalar attributes (i.e. attributes that do not vary with time), and according to another aspect, the scalar attributes can be defined by a user utilizing a graphical user interface (GUI). The calculations module 124 includes one or more relational tables comprising descriptions of calculations or operations defined by a user utilizing a graphical user interface. According to an embodiment, the descriptions comprise conditional elements, i.e. a calculation may apply to a subset of the entities and/or a subset of possible time periods. For example, in the context of a personnel planning application, a calculation can be configured to calculate or determine planned payroll taxes such as CPP premiums based on the salary of an employee.

The calculated costs module 125 as shown in FIG. 1 according to an exemplary implementation comprises a table, for example, a virtual table configured in a computer-readable medium or memory, and comprises the results of calculations, i.e. the output generated by the calculation engine 122. The detailed planning module 126 according to an embodiment comprises an OLAP cube. The detailed planning cube 126 is configured to be populated with detailed data from the calculated costs module 125, and after execution of the planning operations, actual data (for example, data from a payroll management system) which may be used for executing variance calculations. According to another aspect, the detailed planning module 126 is configured to provide reporting data generated through the operation of the calculation engine 122. The financial data module 128 according to an embodiment comprises an OLAP cube that is configured to be populated with summarized data retrieved from the calculated costs module 125. According to another aspect, the financial data module 128 is configured to provide reporting data generated through the operation of the calculation engine 122.

Referring again to FIG. 1, the network 130 may comprise a local area network (LAN), a wide area network (WAN), the Internet or any combination thereof. For the embodiment depicted in FIG. 1, the clients 110 are connected via the Internet indicated generally by reference 130. It will be appreciated that the method and system according to the present invention may be practised or implemented for other networks, communication protocols and/or configurations.

As shown in FIG. 1, the server 120 is configured with a client interface module or application indicated generally by reference 129. The client interface module 129 is configured to provide an interface with the client machines 110. According to an embodiment, the client interface module 129 is implemented with a user interface or GUI (Graphical User Interface) which runs on each of the client machines 110 as indicated generally by reference 112. According to an embodiment, the client interface module 129 and the user interface 112 comprise logic, processes, executable functions, graphical screens and windows, configured to provide a user with the capability to specify a detailed planning operation or calculation, and/or parameters, definitions or other variables associated with the planning operation or calculation, as will be described in more detail below.

The operation and configuration of the detailed planning system and according to embodiments of the invention are described in more detail below with reference to the user interface and screen shots depicted in FIGS. 2 to 48.

According to an embodiment, the detailed planning processor module 128 is configured with a graphical user interface or GUI comprising a "Calculations" screen or window as shown in FIG. 2 and indicated generally by reference 200. According to an embodiment, the detailed planning processor module 128 and the calculations screen 200 are configured to provide a user with a mechanism to configure and/or modify calculations and other operations used the modeling, planning and/or management of operations and procedures associated with an enterprise or other type of organization or entity, as will be described in more detail below.

As shown in FIG. 2 and according to an embodiment, the calculations screen 200 comprises a calculations panel 210 and a menu bar 220. The calculations panel 210 comprises a "Name" column 212 which is configured to display a plurality of calculation or operations associated with the planning function or enterprise. In the context of personnel planning application, the calculation types comprise "Anniversary COLA Increase", "Base Salary", "Car Allowance", "Cell Phone Allowance", "Employee Retirement Contributions", "FICA Tax", "Headcount", "Health Care Premiums", etc. According to another aspect, multiple calculations can have the same name, for example, there can be more than one "Base Salary" calculation, as will be described in more detail below. As also shown in FIG. 2, the calculations panel 210 may include additional columns associated with the calculation types or operations, for example, an "ID" column 214, a "Scenario" column 216, a "Calculation Type" column 218, and a "Comments" column 219. The menu bar 220 comprises an "Add" object (e.g. a button or icon) 222, an "Edit" button or icon 224, a "Delete" button or icon 226, and a "Duplicate" button or icon 228. The menu bar 220 buttons are configured to be responsive to actuation by a user (e.g. in response to a mouse click or other input device) and provide the functionality to manage calculations, as described in more detail below.

Figure 3:
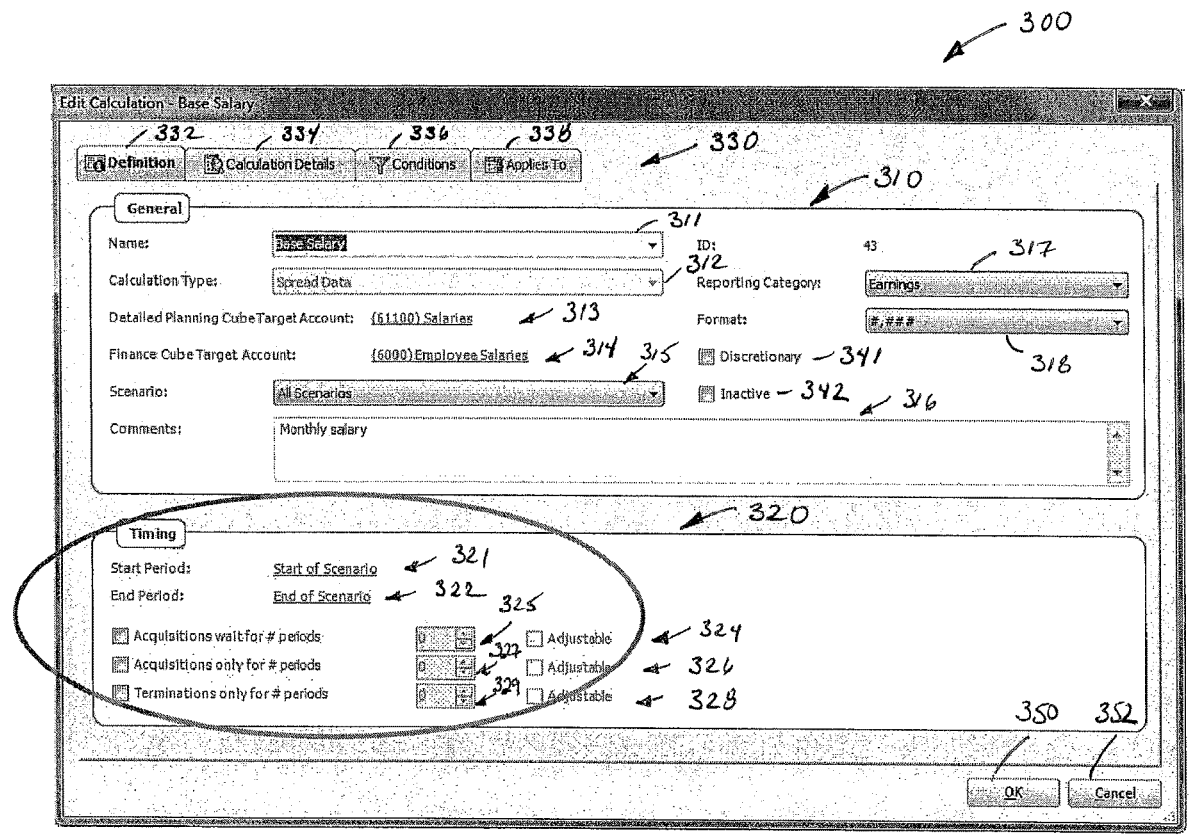
FIG. 3 is an exemplary screen shot of an "Edit" calculation screen or window accessed using the Edit menu bar option on the calculations screen and configured for editing a calculation according to an embodiment of the present invention.

Reference is next made to FIG. 3, which shows a screen shot of an "Edit Calculation" screen or window according to an embodiment of the present invention and indicated generally by reference 300. According to an embodiment, the edit calculations screen 300 is accessed or displayed by the system in response to the Edit object 224 (e.g. icon) being activated, e.g. "clicked" using a mouse or other type of pointing device. The Edit Calculation screen 300 is configured to allow a user to define a calculation, and provides the capability to specify attribute(s) for the calculation. As shown, the Definitions tab of the Edit Calculation screen 300 comprises a "General" dialog box or panel 310, a "Timing" dialog box or panel 320 and a "Menu" toolbar 330. The general dialog box 310 is configured to provide the capability to define a detailed planning calculation or function, i.e. define or specify the attributes or parameters associated with the calculation. As shown, the general dialog box 310 comprises a "Name" drop-down list box 311 for selecting a name for the calculation, a "Calculation Type" drop-down list box 312 configured for defining the type of calculation, a "Scenario" drop-down list box 315, a "Comments" entry box 316, a "Reporting Category" drop-down list box 317, and a "Format" drop-down list box 319. As shown, the general dialog box 310 may also include OLAP cube information, for example, cube target accounts, comprising a "Detailed Planning Cube Target Account" and a "Finance Cube Target Account" indicated respectively by references 313 and 314. According to an embodiment, the cube target accounts are configured as active links, e.g. HTML links and allow a user to actuate either field (for example, through a mouse click) and in response the system is configured to display an associated dialog box (not shown) which allows the user to specify a target account, e.g. "(61100) Salaries", in the Detailed Planning Cube 126 (FIG. 1) and/or a target account, e.g. "(6000) Employee Salaries", in the Finance Cube 128 (FIG. 1). As also shown in FIG. 3, additional user selectable controls are provided, comprising a "Discretionary" check box 341 and an "Inactive" check box 342. The discretionary check box 341 is configured to allow a user to configure the calculation as a discretionary calculation as will be described in more detail below, and the inactive check box 342 is configured to allow a user to make the calculation inactive. As also shown in FIG. 3, the Edit Calculations screen 300 includes an "OK" button or icon 350 and a "Cancel" button or icon 352. The OK button 350 is implemented in known manner and configured to save the user entered settings to memory which are then utilized by the calculation engine 122 (FIG. 1) to then configure the calculation or function. The Cancel button 352 is also implemented in known manner and configured to allow the user to exit the Edit Calculation screen 300 without saving any of the changes or entries.

According to an embodiment, the timing dialog box 320 is configured to allow a user define one or more time vectors. According to one aspect, the detailed planning operations, i.e. calculations, are based on the time vectors and the timing dialog box 320 is configured to allow a user to define the time scope of the time vectors using various parameters and attributes, as described in more detail below. As shown, the timing dialog box 320 includes a "Start Period" indicator field 321 and an "End Period" indicator field 322. According to an embodiment, the start period 321 and the end period 322 indicator fields are configured as active links, e.g. HTML links, and allow a user to actuate either field (for example, using a mouse click) and in response the system displays a dialog box (not shown) which allows the user to specify or configure a start time or date and/or an end time or date. According to another aspect, the timing dialog box 320 is configured to allow further time parameters to be specified, for example, a make "Adjustable" check box select indicated by reference 324, and an "Acquisitions wait for # periods" and a drop-down list box for specifying the number of periods indicated by reference 325; a make "Adjustable" check box select indicated by reference 326 and an "Acquisitions only for # periods" and a drop-down list box for specifying the number of periods indicated by reference 327; and a make "Adjustable" check box select indicated by reference 328, and a "Terminations only for # periods" and a drop-down list box for specifying the number of periods indicated generally by reference 329, as shown in FIG. 3.

Figure 4:
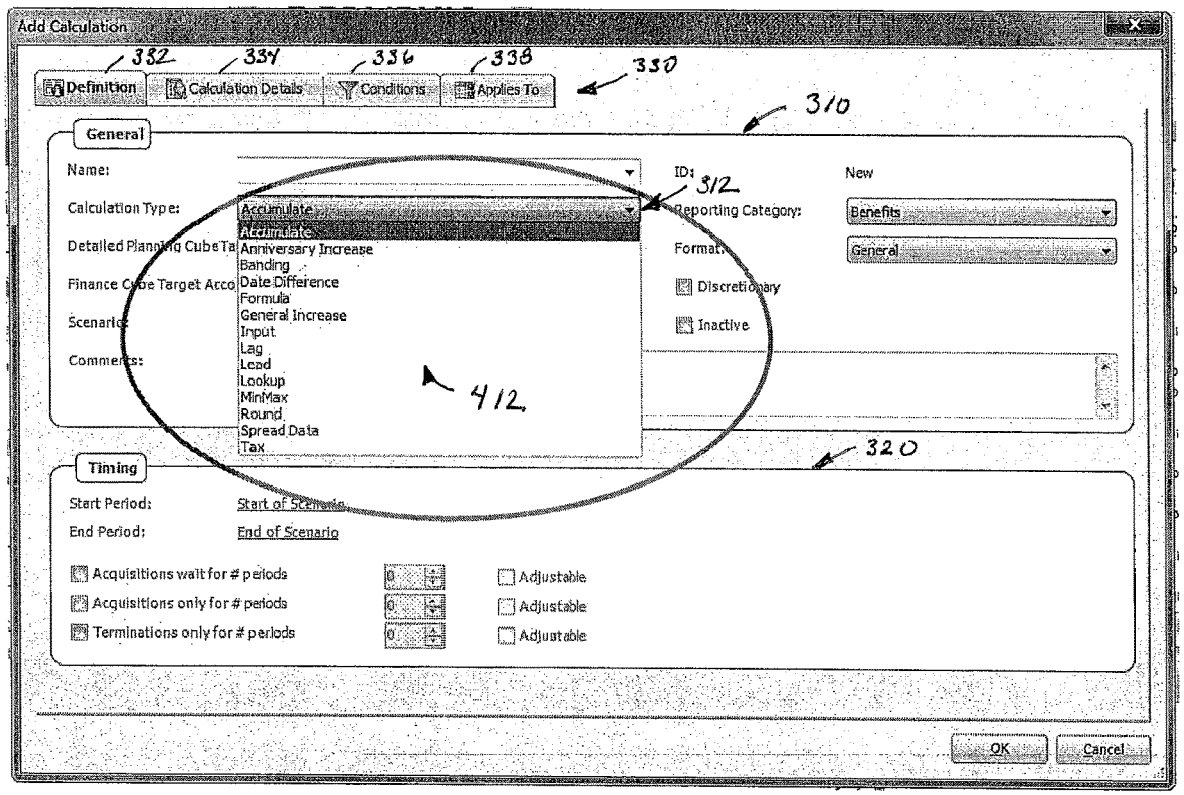
FIG. 4 is an exemplary screen shot of an "Add" calculation screen or window accessed using the Add menu bar option on the calculations screen and configured for editing a calculation according to an embodiment of the present invention.

Reference is next made to FIG. 4, which shows a configuration for the Edit Calculation screen 300 according to an embodiment of the present invention. The Edit Calculation screen is configured as an "Add Calculation" screen, i.e. for a user to add a calculation. As described above, the Edit Calculation screen as described above comprises the general dialog box 310, the timing dialog box 320 and the menu toolbar 330, for example, as described above. In accordance with the embodiment, the "Calculation Type" drop-down list box 312 is configured with pre-set or pre-coded calculation types indicated generally by reference 412. In the context of a personnel planning application or implementation, the calculation types 412 comprise "Accumulate", "Anniversary Increase", "Banding", "Date Difference", "Formula", etc. as shown in FIG. 4. In accordance with the embodiment, a user selects one of the calculation types 412 and the system is configured to generate and/or present parameters or attributes that are specific to the calculation type, and may also be modified by a user as will be described in more detail below.

Figure 5:
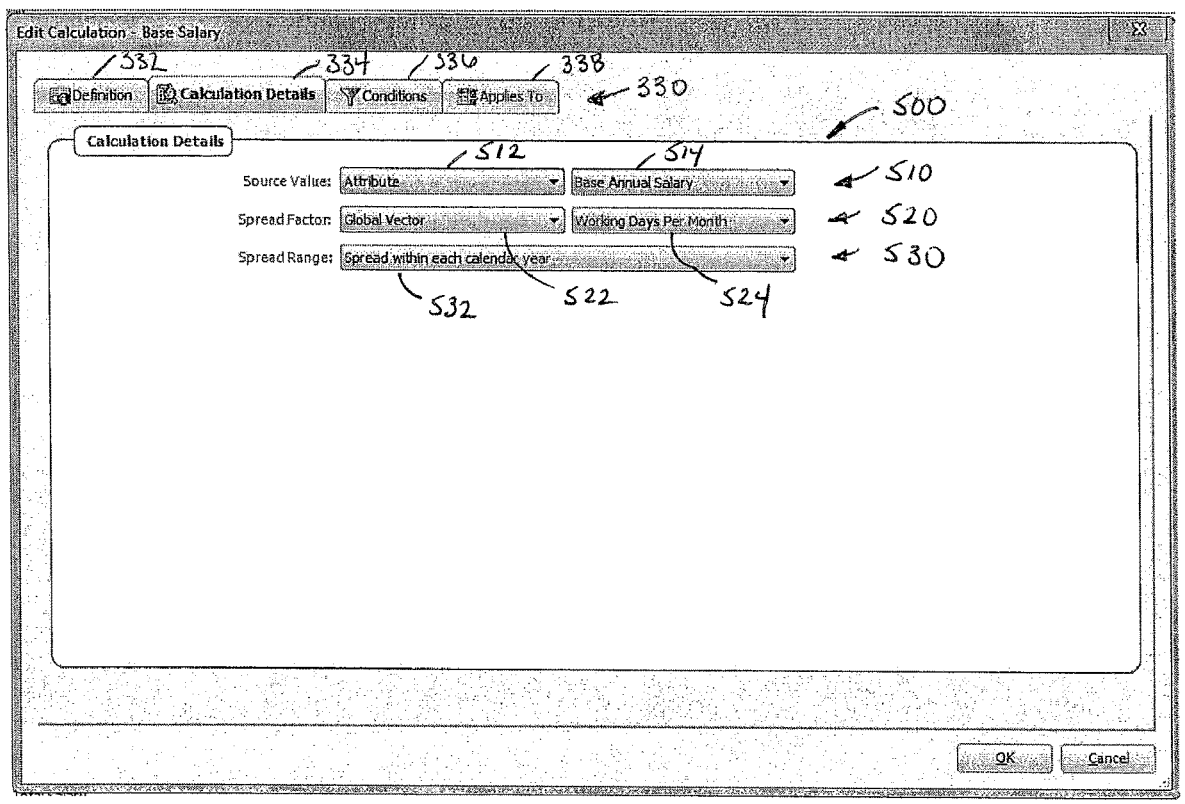
FIG. 5 is an exemplary screen shot of a "Calculations Details" window or panel accessed using the calculation details tab on the Edit Calculation screen and configured for changing parameters for a calculation according to an embodiment of the present invention.
Figure 6:
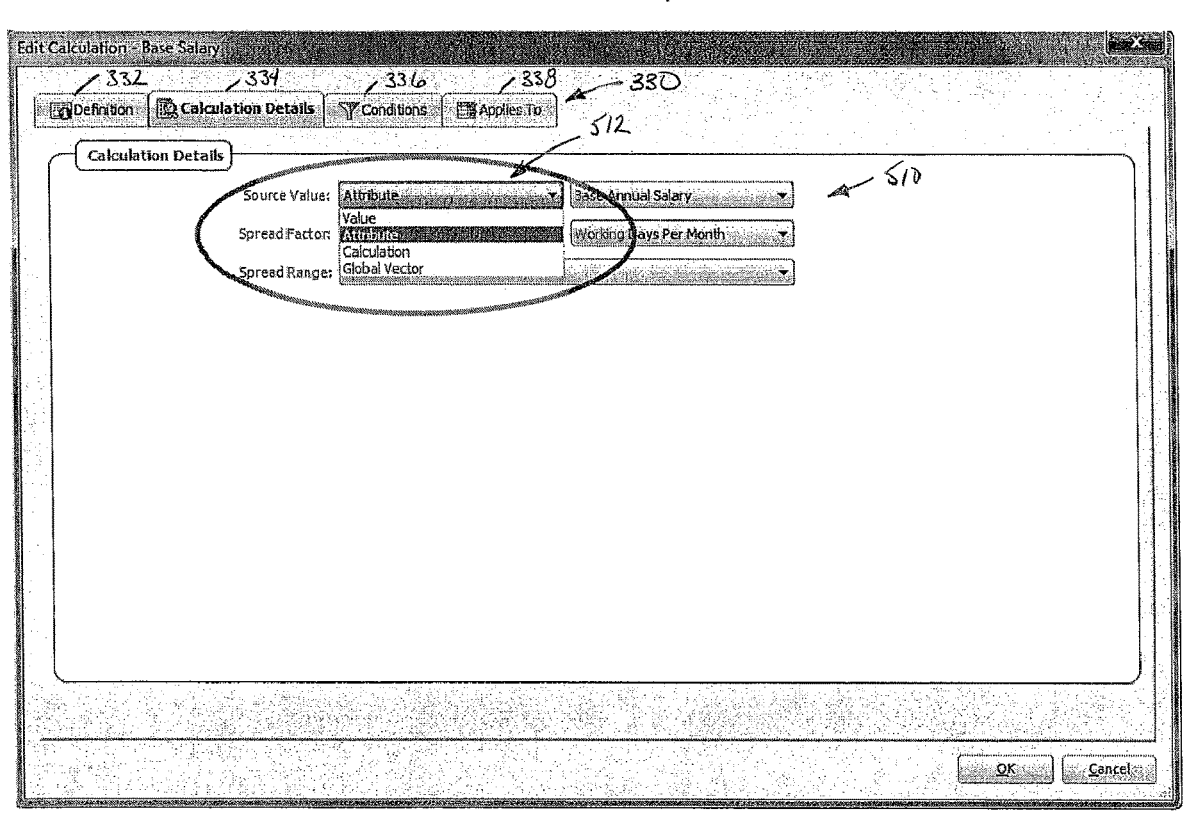
FIG. 6 is an exemplary screen shot of the "Calculations Details" window or panel showing the "Source Value" parameter and the configurable parameter types for the source value according to an embodiment of the present invention.
Figure 8:
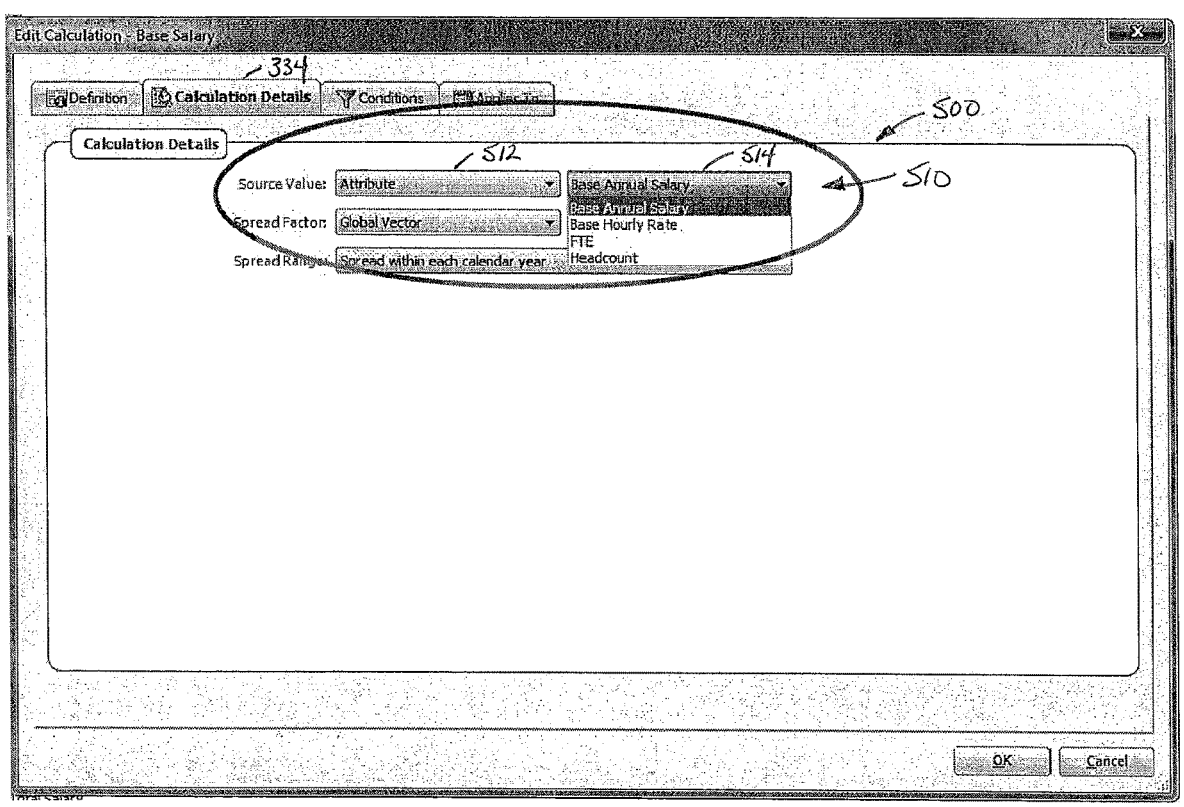
FIG. 8 is an exemplary screen shot of the "Calculations Details" window or panel showing the "Source Value" parameter configurable as an "Attribute" according to an embodiment of the present invention.

Reference is next made to FIG. 5, which shows the Edit Calculation screen 300 configured with a "Calculation Details" dialog box or panel indicated generally by reference 500. The calculation details dialog box 500 is invoked or displayed in response to the Calculation Details button or tab 334 being clicked. The calculations details dialog box 500 is configured and tailored with associated parameters or attributes according to the type of calculation. According to an embodiment, the parameters are not user specified, but instead pre-coded or configured in the system. The user can however change the value of the parameters for a calculation, for example, as described in more detail below. The calculation details dialog box 500 depicted in FIG. 5 is configured for the "Spread Data" calculation 412 (FIG. 4). According to an embodiment, the spread data calculation comprises a source value parameter 510, a spread factor parameter 520 and a spread range parameter 530. Each of the parameters, in turn, can have multiple parameter types which are configured to be user selectable. For example, the source value parameter 510 comprises a first parameter type 512 and a second parameter type 514. The first parameter type 512 is configured to have four user selectable parameter types: "Value", "Attribute", "Calculation" and "Global Vector", as shown in FIG. 6. For the Attribute parameter type 512, the second parameter type 514 is configured to have four user selectable parameter types: "Base Annual Salary", "Base Hourly Rate", "FTE" and "Headcount", as shown in FIG. 8.

Figure 7:
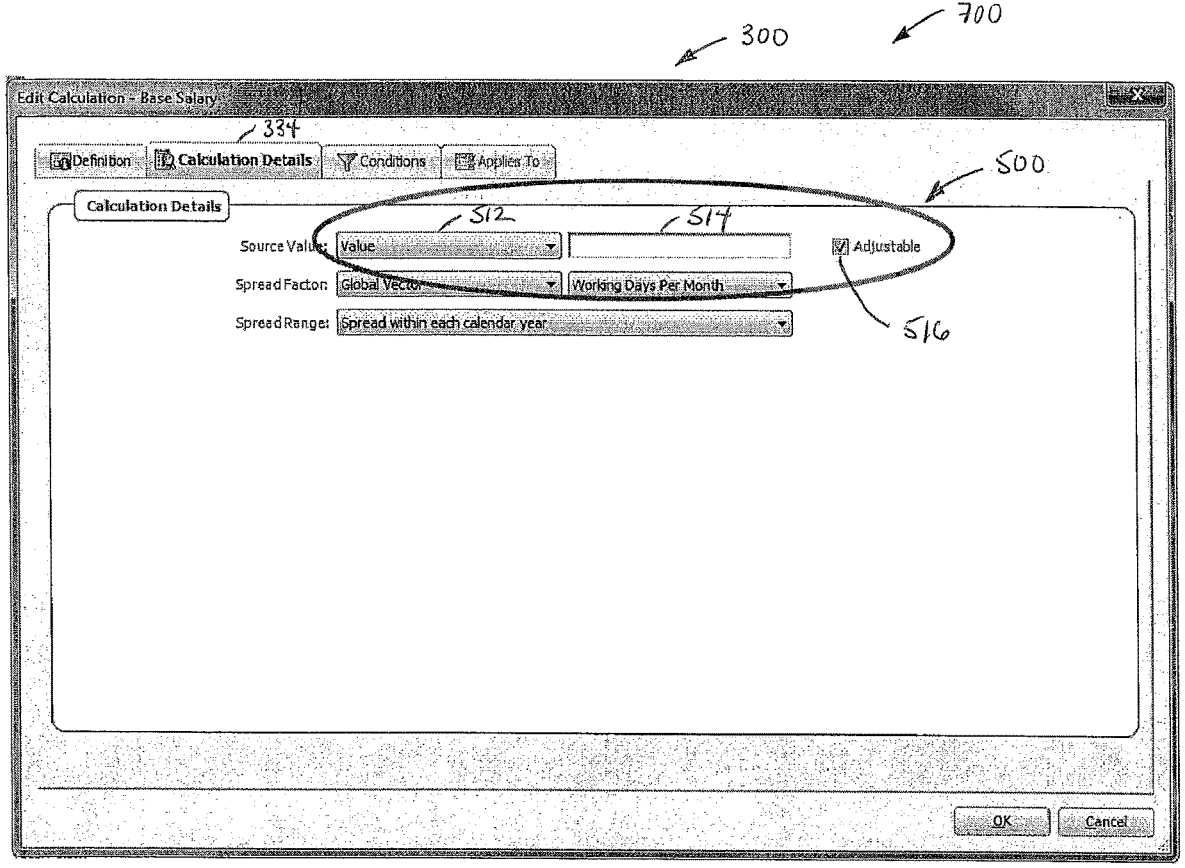
FIG. 7 is an exemplary screen shot of the "Calculations Details" window or panel showing the "Source Value" parameter configurable for a scalar value according to an embodiment of the present invention.

According to another aspect, for the Value parameter type 512, the Calculation Details dialog box 500 is configured to allow a user to enter a scalar value in the second parameter type box 514 as shown in FIG. 7. As shown in FIG. 7, the calculations details dialog box 500 includes an "Adjustable" check box 516. The adjustable check box 516 is configured to allow a user to flag the value parameter, i.e. the scalar value, as being adjustable by other users. According to an exemplary implementation, the calculation engine 122 (FIG. 1) is configured to operate on time-based vectors, and a scalar value is interpreted or treated as a time vector comprising the same value (i.e. the value entered in the scalar field 514) in each time period. According to another aspect, the Attribute parameter type 512 is configured to allow a user to select a scalar numerical value for the Employee attribute. The calculation engine 122 (FIG. 1) is configured to use the scalar value for that employee for each employee comprising the calculation operation. As described above, the scalar value is treated by the system as a time vector with the same value in each time period.

Figure 9:
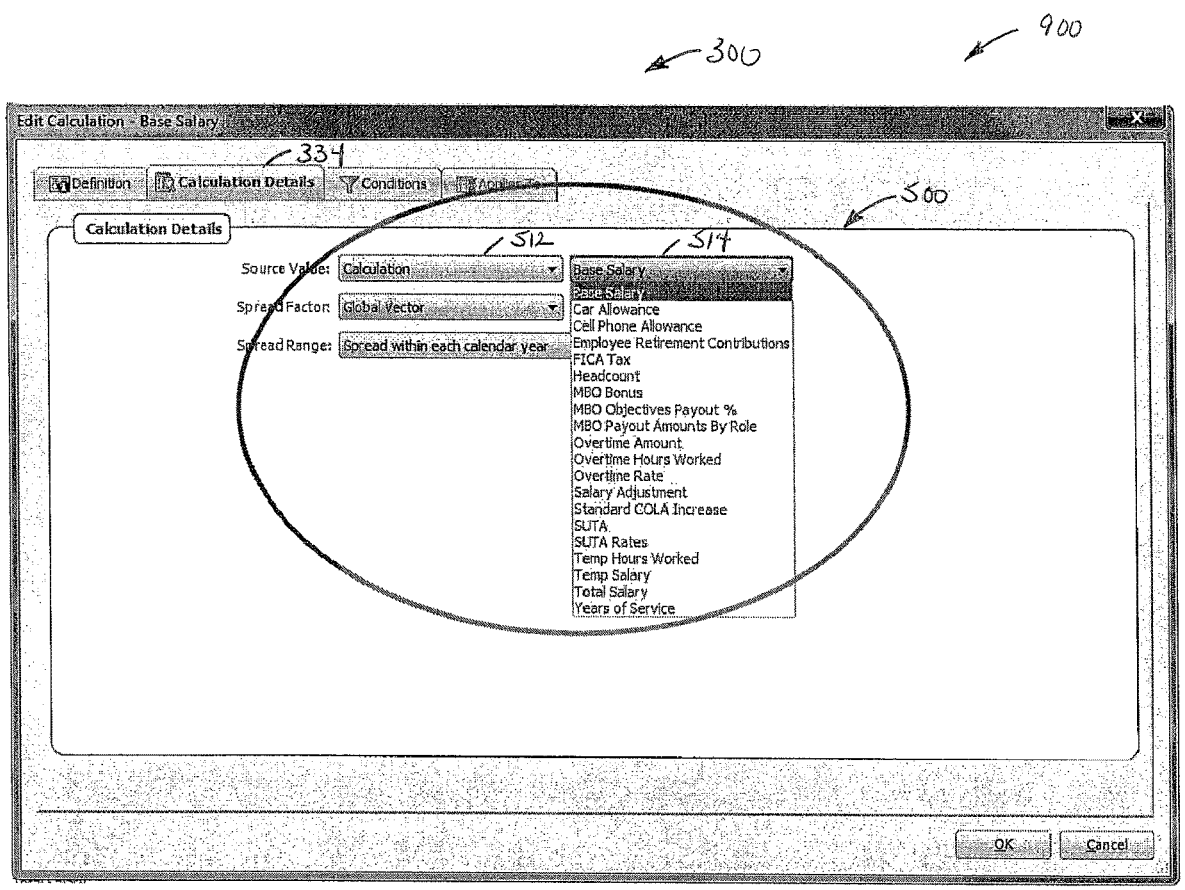
FIG. 9 is an exemplary screen shot of the "Calculations Details" window or panel showing the "Source Value" parameter configurable as a "Calculation" according to an embodiment of the present invention.

According to an embodiment, the system is configured to allow the user to select another calculation for the second parameter type 514 when the first parameter type 512 is selected as the "Calculation" parameter type as shown in FIG. 9. For an exemplary personnel planning application or implementation, the calculations comprise: "Base Salary", "Car Allowance", "Cell Phone Allowance", "Employee Retirement Contributions", etc. as shown in FIG. 9. The calculation engine 122 (FIG. 1) is configured to treat the calculations as time vectors and according to another aspect configured to execute the calculations in a predefined or required order.

Figure 10:
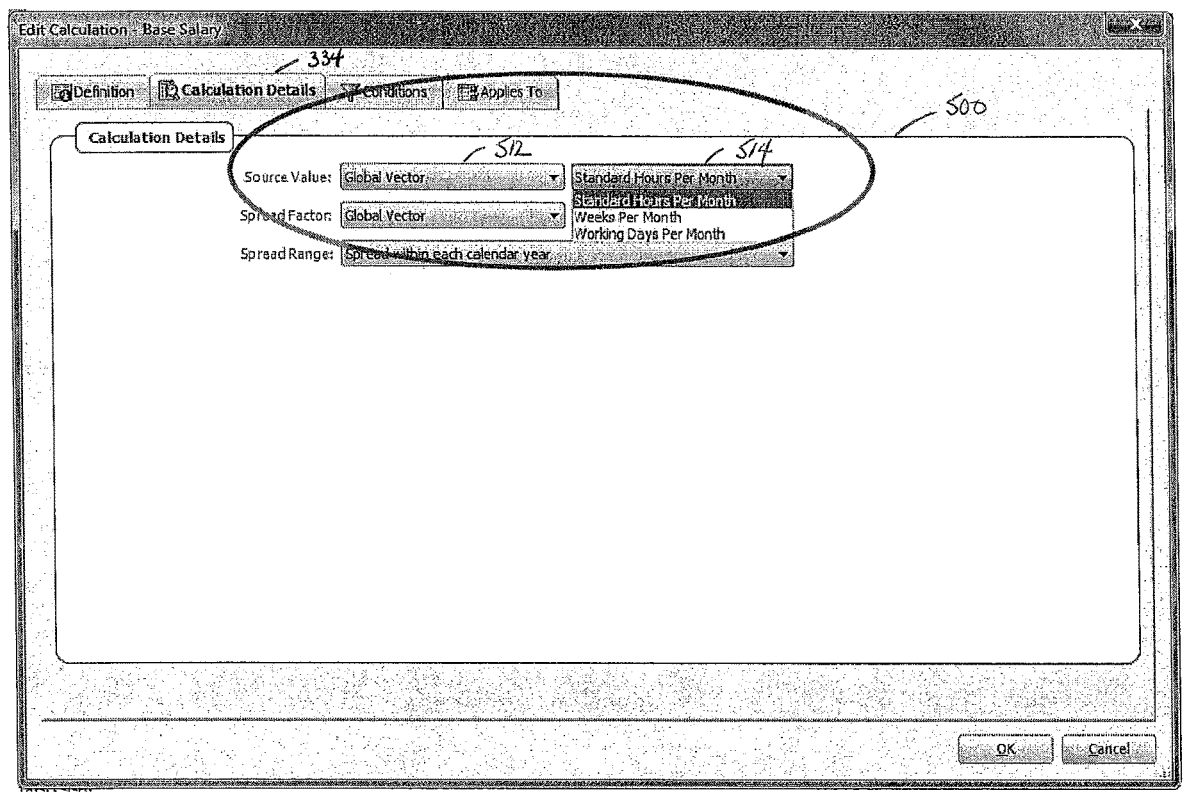
FIG. 10 is an exemplary screen shot of the "Calculations Details" window or panel showing the "Source Value" parameter configurable as a "Global Vector" according to an embodiment of the present invention.

As shown in FIG. 10, the Global Vector parameter type 512 is configured to allow a user to select a global vector. According to an exemplary implementation for a personnel planning application, the global vectors comprise time vectors that do not vary by employee. As shown, the second parameter type 514 for a Global Vector comprises "Standard Hours Per Month", "Weeks Per Month" and "Working Days Per Month", according to an exemplary personnel planning implementation. Numerical data for a global vector is entered from another screen, as described in more detail below.

Figure 11:
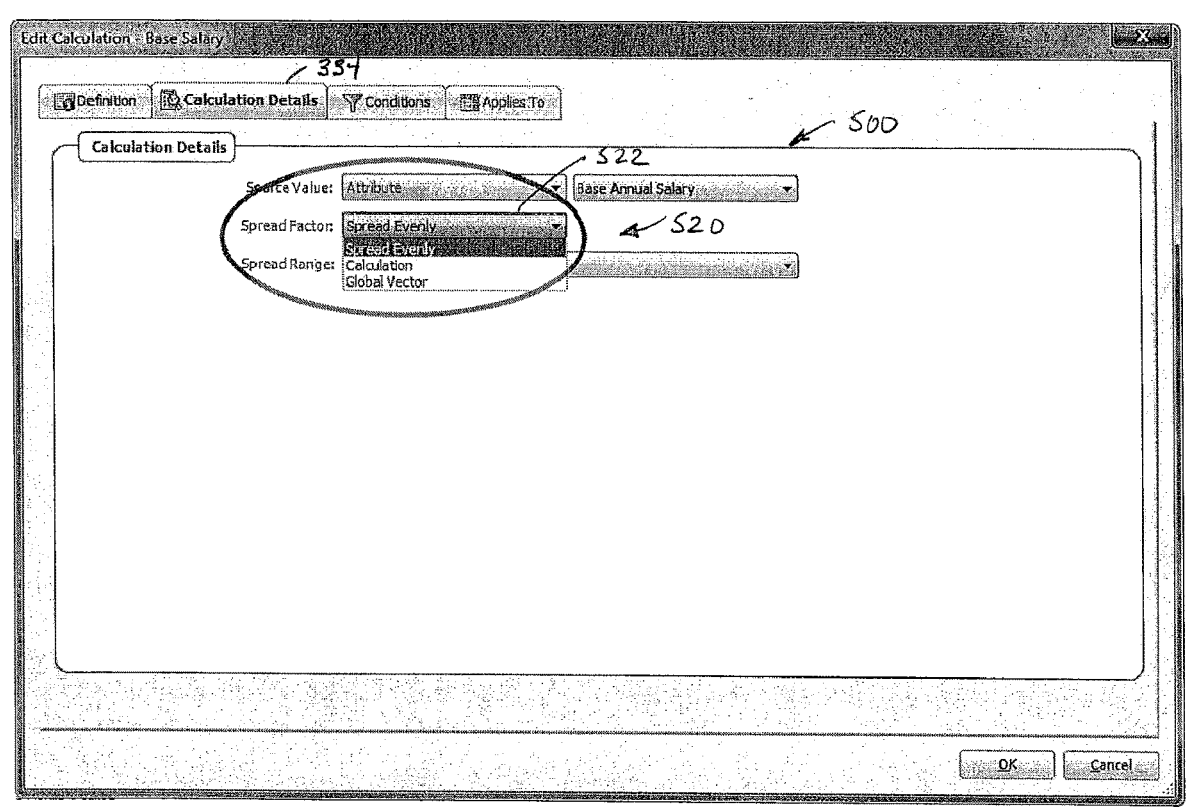
FIG. 11 is an exemplary screen shot of the "Calculations Details" window or panel showing the "Spread Factor" parameter and the configurable parameter types for the spread factor according to an embodiment of the present invention.

Reference is next made to FIG. 11, which shows an exemplary implementation for the Spread Factor attribute 520 and more particularly the spread factor parameter 522. As shown, the spread factor parameter 522 is configured to have one of three parameter types: "Spread Evenly", "Calculation" or "Global Vector. It will be appreciated that each of these parameters types comprise time vectors, and spread evenly is a virtual time vector with the same value in all time periods.

Figure 12:
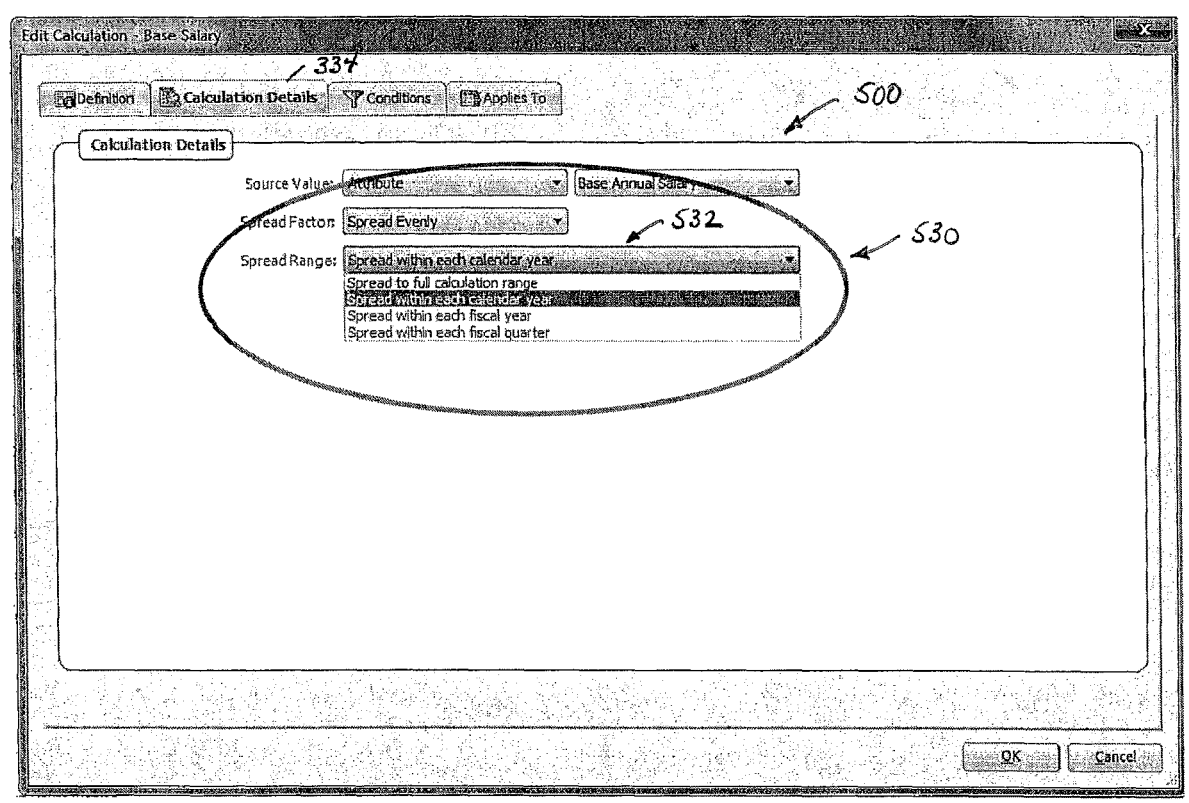
FIG. 12 is an exemplary screen shot of the "Calculations Details" window or panel showing the "Spread Range" parameter and the configurable parameter types for the spread range according to an embodiment of the present invention.

Reference is next made to FIG. 12, which shows an exemplary implementation for the "Spread Range" attribute indicated generally by reference 530 and having a parameter type comprising drop-down list indicated generally by reference 532. According to an exemplary implementation, the spread range parameter is configured for four parameter types: "Spread within each calendar year", "Spread to full calculation range", "Spread within each calendar year", "Spread within each fiscal year" or "Spread within each fiscal quarter", as shown in FIG. 12. It will be appreciated that the spread range parameters do not comprise data objects (for example, values or attributes), but rather are configured as a calculation that is to be performed by specifying the range across which data is to be spread. According to an exemplary implementation, the value that is calculated in a single time period for the Spread Data calculation type is equal to:

$$SD(t) = SV(t) \cdot \frac{SF(t)}{\sum_{1}^{n} SF(t_i)}$$

Where SD(t) is the result of the calculation for time period t, SV(t) is the value of the Source Value at time period t, SF(t) is the value of the Spread Factor at time period t and $\Sigma_1^n SF(t_i)$ is the sum of the values of the Spread Factor for all time periods in the spread range of which t is a member.

For example, if a fiscal year starts in January and the spread is set to occur within each fiscal quarter, then the calculation engine 122 (FIG. 1) is configured to execute the calculations as follows:

| Time Period | January | February | March | April | May | June |
|---|---|---|---|---|---|---|
| Source Value | 100 | 200 | 200 | 200 | 300 | 300 |
| Spread Factor | 5 | 4 | 4 | 5 | 4 | 4 |
| Calculation Result | 38.46 | 61.54 | 61.54 | 76.92 | 92.31 | 92.31 |

Where 38.46 = 100 * 5/(5 + 4 + 4)

Figure 13:
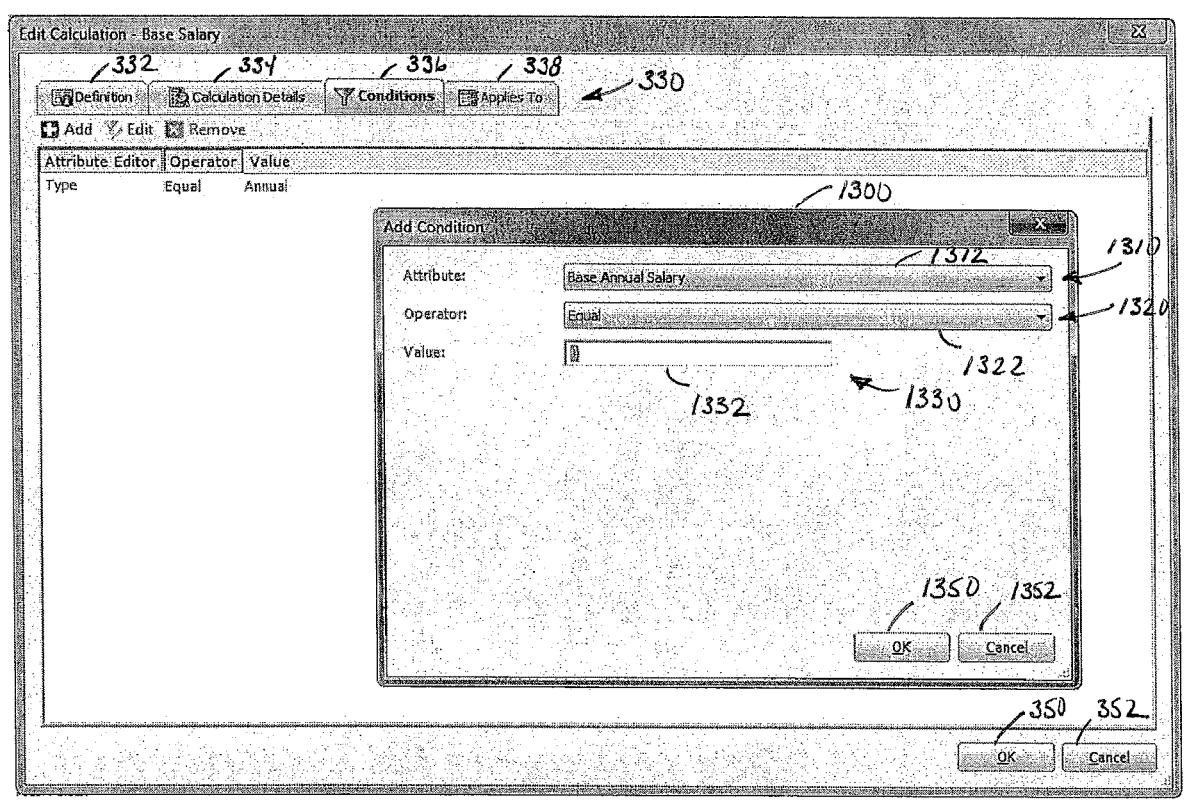
FIG. 13 is an exemplary screen shot of an "Add Condition" window or panel accessed using the conditions tab on the Edit Calculation screen and configured for specifying conditions for a calculation according to an embodiment of the present invention.
Figure 14:
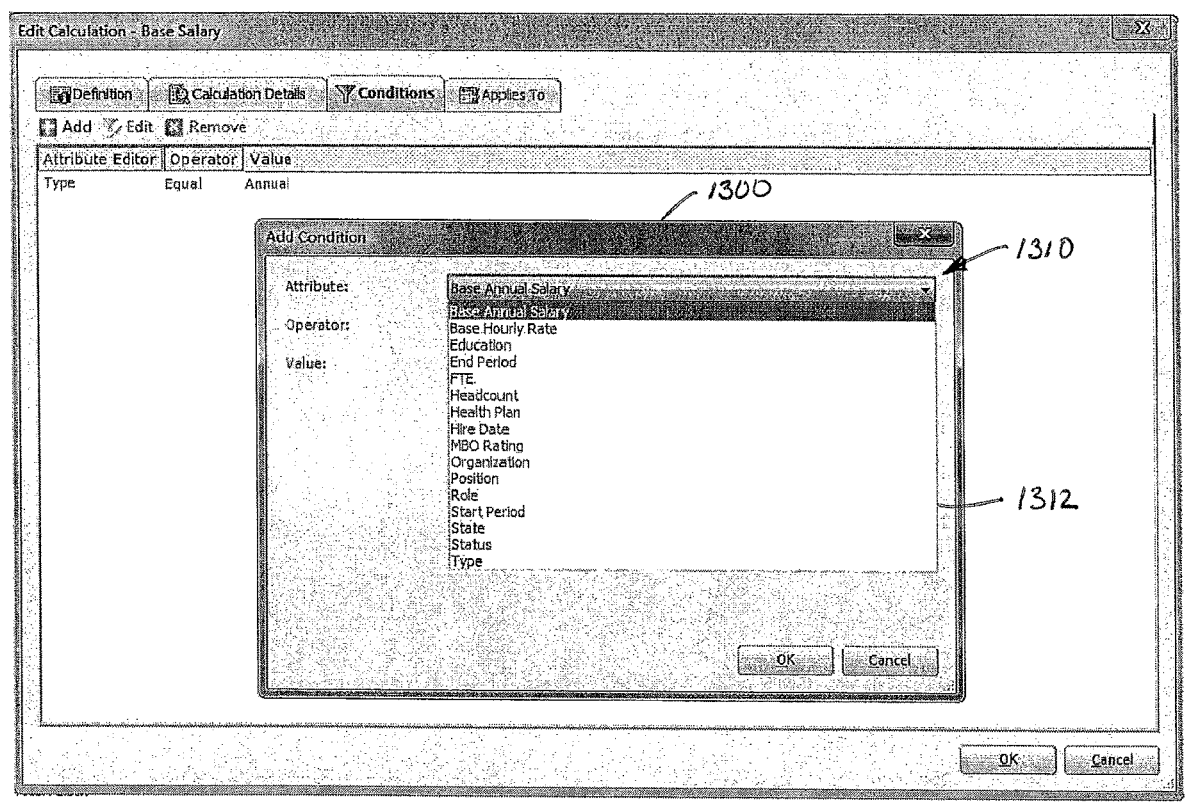
FIG. 14 is an exemplary screen shot of the "Add Condition" window or panel accessed using an employee attribute condition and configured for selecting an employee attribute according to an embodiment of the present invention.
Figure 15:
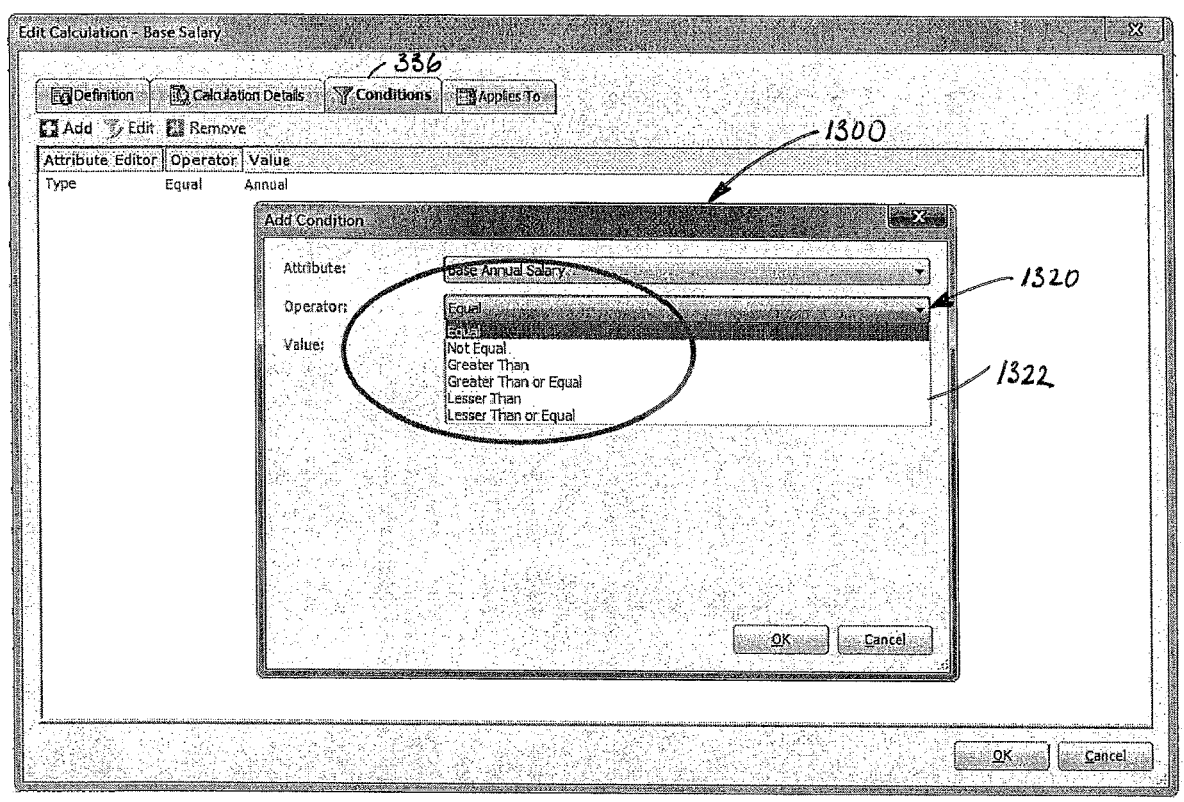
FIG. 15 is an exemplary screen shot of the "Add Condition" window or panel accessed using an employee attributes condition and configured for selecting a numerical operator associated with the employee attribute according to an embodiment of the present invention.
Figure 16:
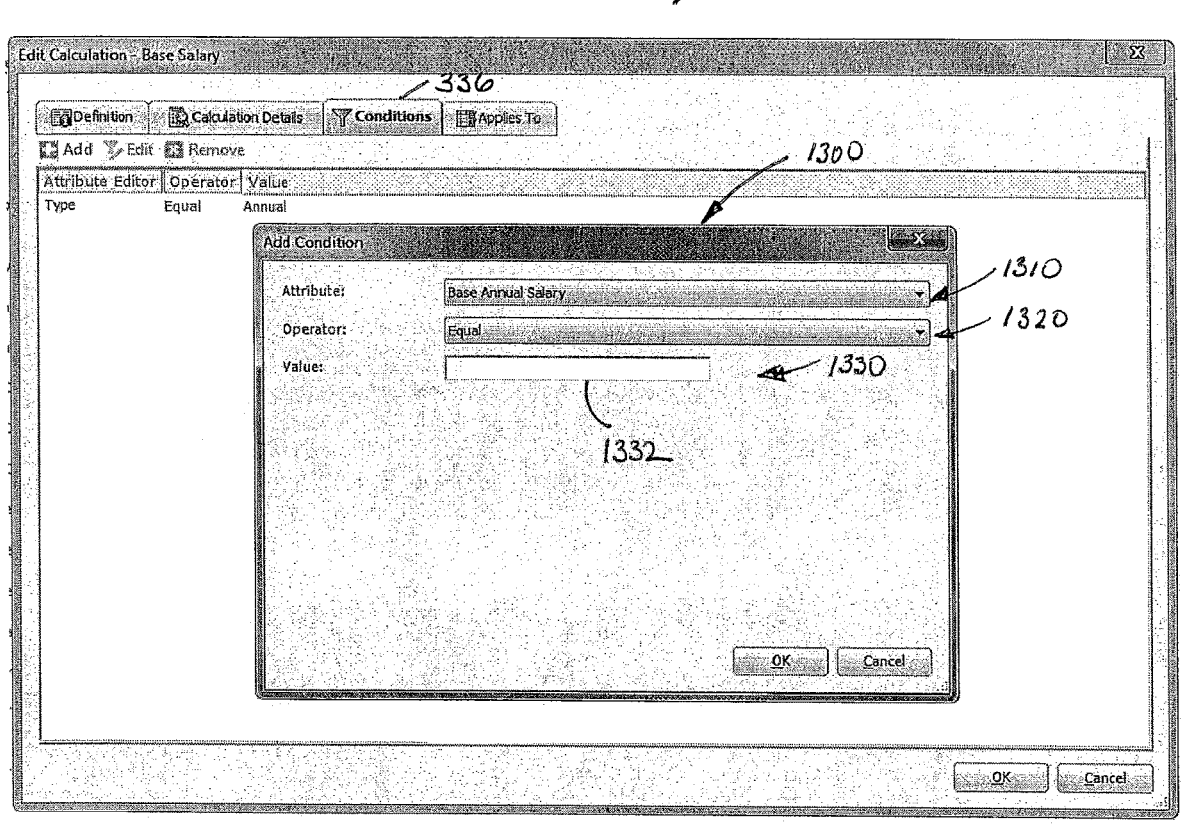
FIG. 16 is an exemplary screen shot of the "Add Condition" window or panel accessed using an employee attributes condition and configured for selecting a value for the employee attribute according to an embodiment of the present invention.
Figure 17:
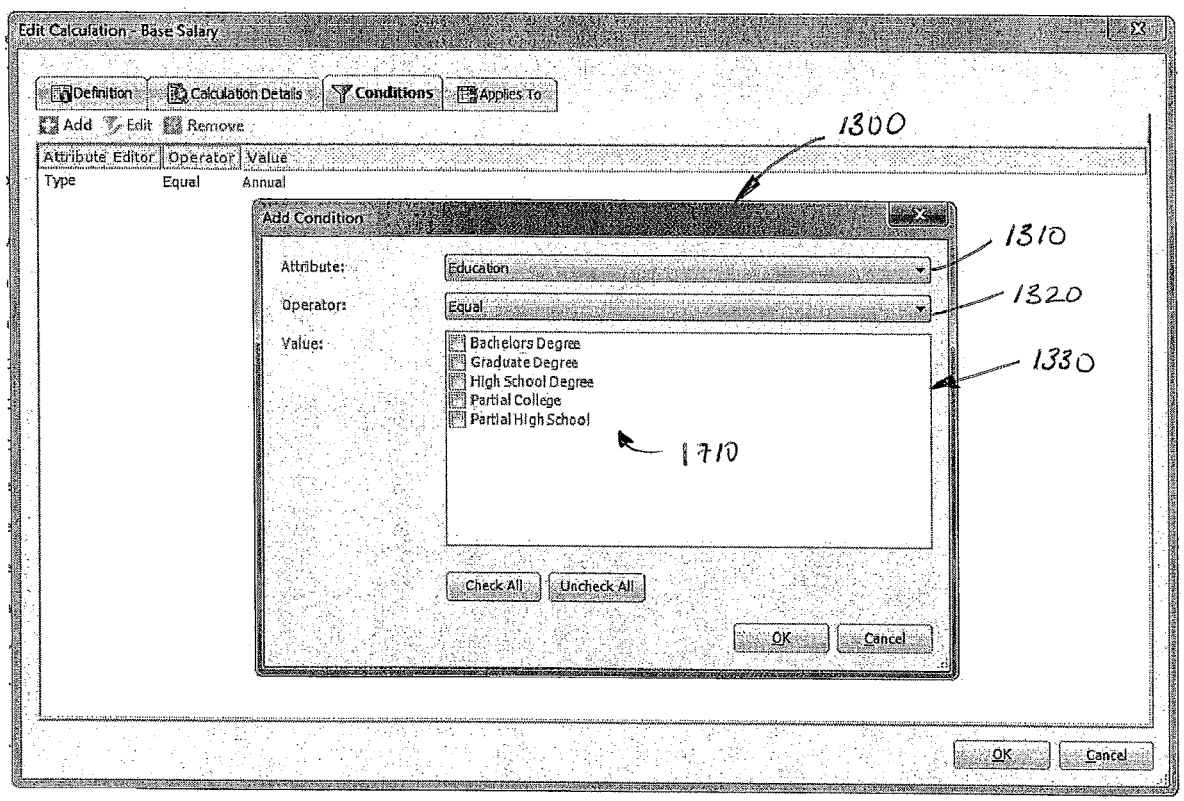
FIG. 17 is an exemplary screen shot of the "Add Condition" window or panel accessed using an employee attributes condition and configured for displaying a list of one or more employee attribute values selectable by a user according to an embodiment of the present invention.

Reference is next made to FIG. 13, which shows the Edit Calculation screen 300 configured with an "Add Condition" dialog box or panel indicated generally by reference 500. The calculation details dialog box 1300 is invoked or displayed in response to the Conditions tab 336 being selected and the Add menu item being clicked. The Add Condition dialog box 1300 is configured to allow a user to define or add a condition and other attributes to a calculation. As shown, the Add Condition dialog box 1300 is configured with an Attribute type 1310, an Operator parameter 1320 and a Value parameter 1330. According to an embodiment, the Attribute type 1310 comprises employee attributes selectable from a drop-down list box 1312 and include (as shown in FIG. 14): "Base Annual Salary", "Base Hourly Rate", "Education", "End Period", "FTE", "Headcount", "Health Plan", "Hire Date", etc. It will be appreciated that each of the employee attributes will have an attribute type, for example, numerical, text, date, dimension member, list, etc. As shown, the Add Condition dialog box 500 is also configured with an OK button 1350 and a Cancel button 1352. According to an embodiment, the operator parameter 1320 is configured for numerical or mathematical attributes, and comprises a drop-down list box 1322 with user-selectable numerical employee attributes: "Equal", "Not Equal", "Greater Than", "Greater Than or Equal", "Lesser Than" or "Lesser Than or Equal" as shown in FIG. 15. According to an embodiment, the value parameter 1330 comprises a text input box 1332 as shown in FIG. 16 and is configured to accept a numerical value as inputted by the user. According to an embodiment, the value parameter 1330 comprises a "List" for the employee attribute, "Education", and includes a plurality of user selectable check boxes 1710 as shown in FIG. 17. The operator parameter 1320 can have a setting of Equal or Not Equal.

Figure 18:
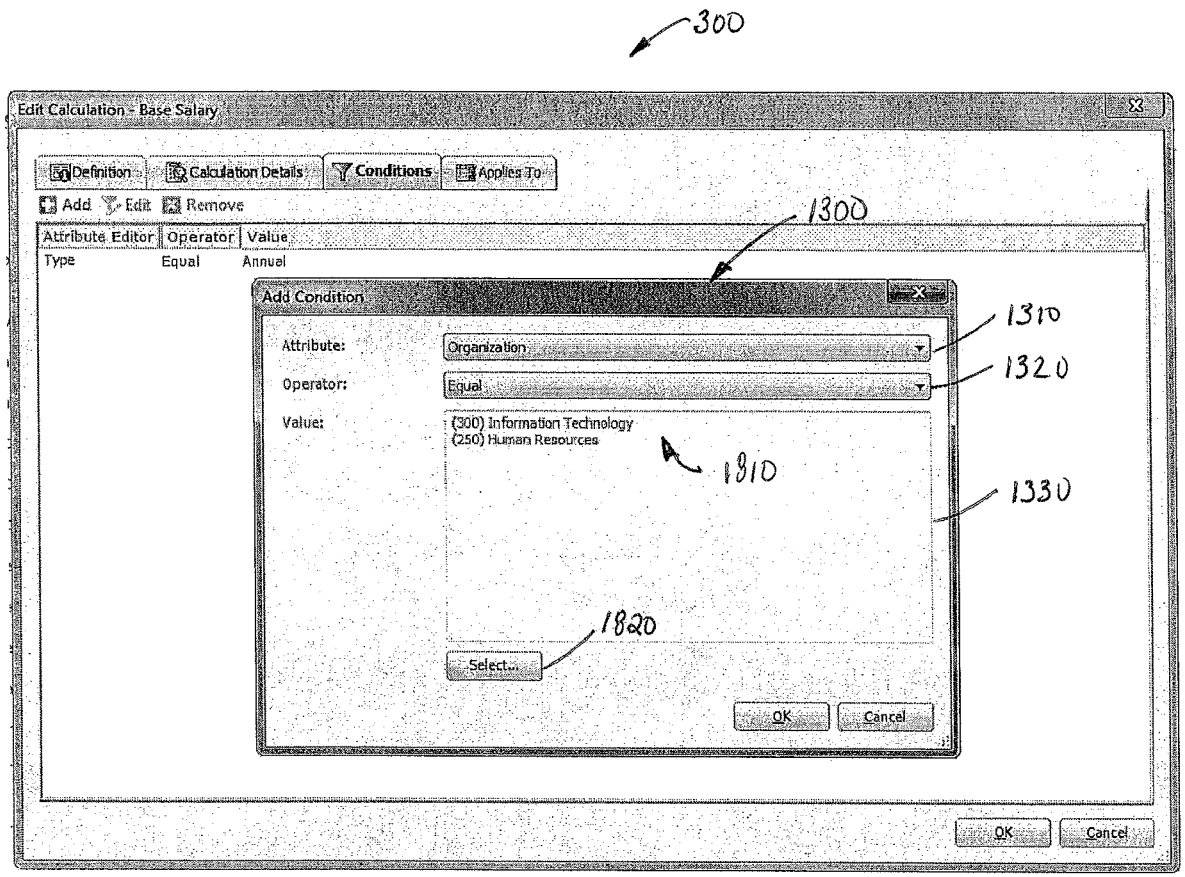
FIG. 18 is an exemplary screen shot of the "Add Condition" window or panel accessed using an employee attributes condition comprising a "dimension member" and configured for selecting one or more members associated with the dimension according to an embodiment of the present invention.
Figure 19:
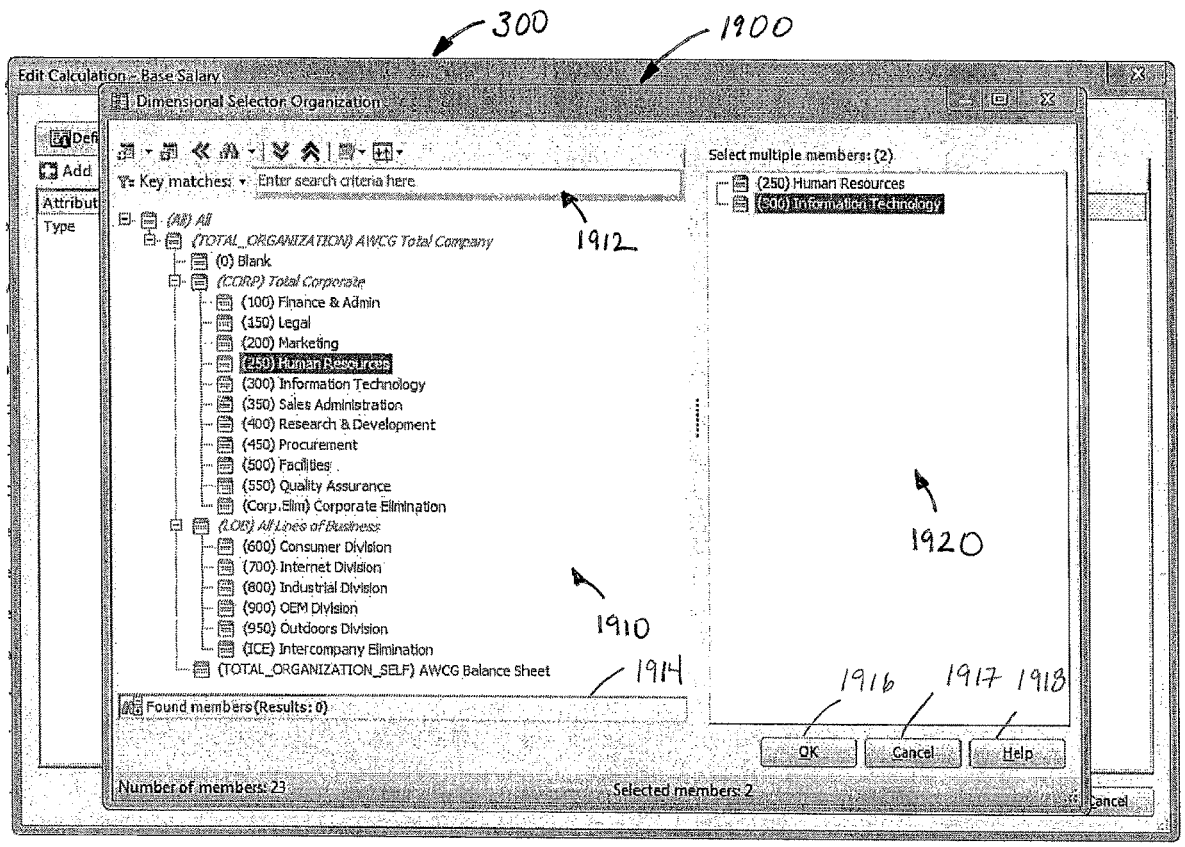
FIG. 19 is an exemplary screen shot of a Dimensional Selector dialog box or panel accessible from the add condition window and configured for selecting one or more members associated with the dimension according to an embodiment of the present invention.

According to an embodiment for the employee attribute, "Organization" 1310, the value parameter 1330 as shown in FIG. 18 comprises a "Dimension Member" type 1810. For the example depicted in FIG. 18, the dimension members 1810 comprise "Information Technology" and "Human Resources". The operator parameter 1320 can have a setting of Equal or Not Equal. As also shown in FIG. 18, the Add Condition dialog box 1300 is configured with a "Select" button or icon 1820. The select button 1820 is configured to be responsive to a user actuation for displaying a screen configured to allow the user to select one or more dimension members to be associated with the attribute type 1310. According to an embodiment, the server 120 (FIG. 1) is configured to display a "Dimensional Selector" dialog box or screen indicated generally by reference 1900 as shown in FIG. 19. As shown, the dimensional selector dialog box 1900 comprises a dimension dialog box or panel 1910 and a selected dimension panel 1920. The dimension dialog box 1910 is configured with a GUI tree view or structure to show all the dimensions and/or a subset of the dimensions (i.e. according to search criteria entered in a text box or field 1912). In known manner, the GUI tree view 1910 is configured with nodes and comprises a clickable buttons or icons for expanding and collapsing the tree view nodes to access related members (i.e. "children"). The dimension selector dialog box 1900 also includes an "Enter Search Criteria" text box 1912 and a "Found Members" text display box 1914 and "OK", "Cancel" and "Help" buttons 1916, 1917 and 1919, respectively, configured to function in known manner. The selected dimension panel 1920 is configured to display the member(s) selected from the tree structure or view, for example, "Human Resources" and "Information Technology".

Figure 20:
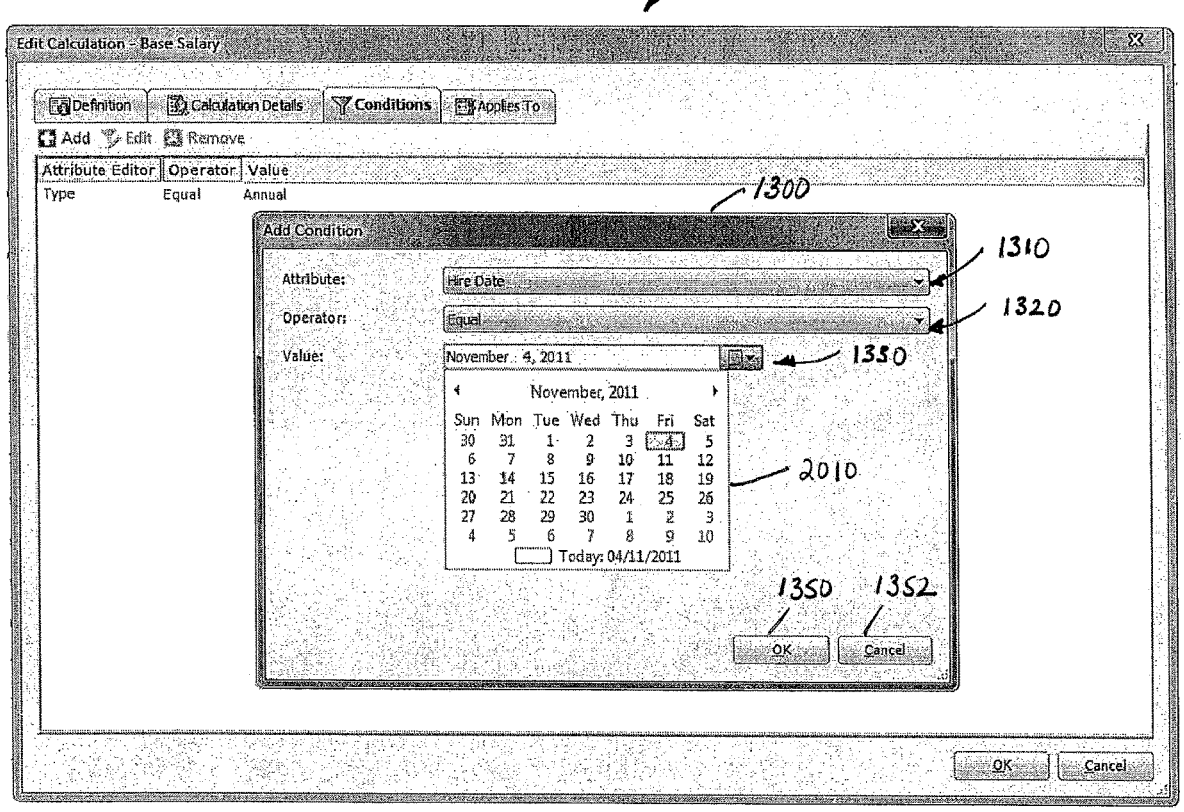
FIG. 20 is an exemplary screen shot of the "Add Condition" window or panel accessed using an employee attributes condition comprising type "Date" and configured for selecting a date from a graphical representation of a calendar according to an embodiment of the present invention.

According to an embodiment and as shown in FIG. 20, the employee attribute type 1310 includes a "Hire Date" setting, and the value parameter 1330 is configured in the form of a "Date" and includes a "Calendar" configured as a drop-down box indicated generally by reference 2010. The operator parameter 1320 is configured to be "Equal" or "Not Equal" as also shown in FIG. 20. The user selection(s) are stored to memory or discarded using the OK button 1350 or Cancel button 1352 in known manner.

Figure 21:
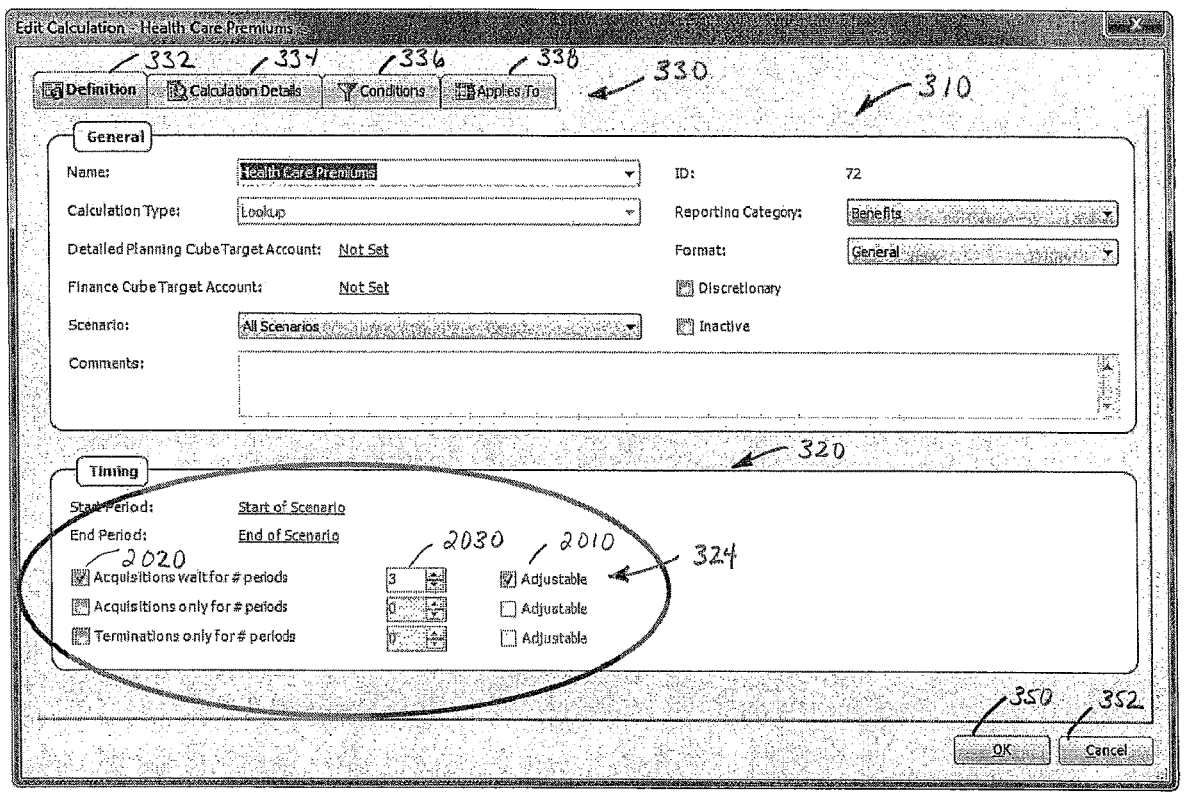
FIGS. 21 to 23 are exemplary screen shots of the "Calculations Details" window or panel showing a configuration for setting up an exemplary adjustable calculation according to an embodiment of the present invention.
Figure 22:
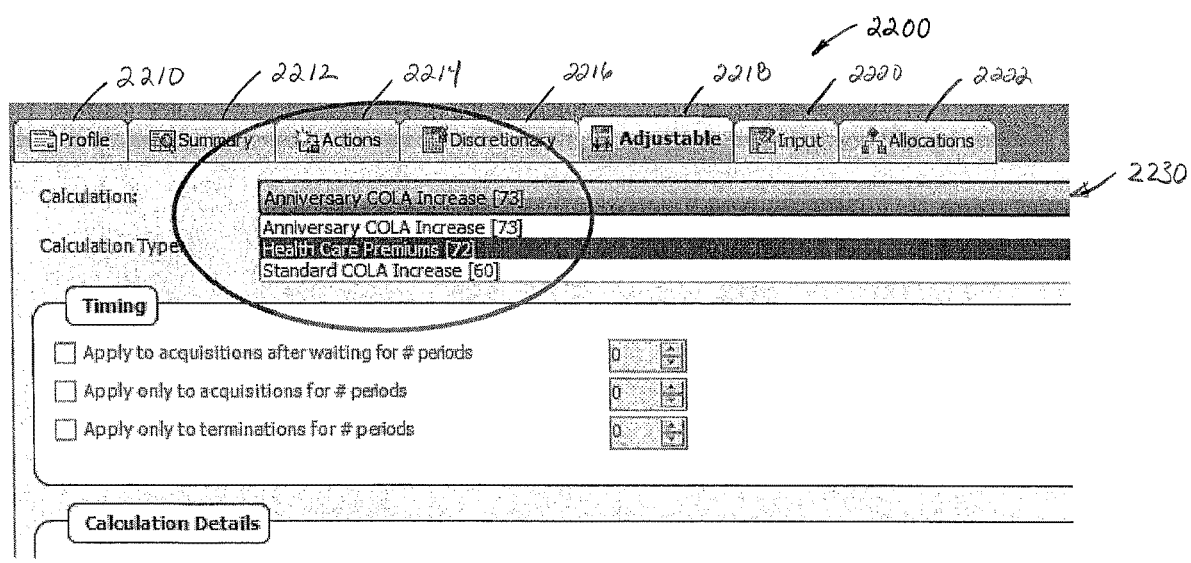

Reference is next made to FIG. 21, and the Edit Calculation screen 300 configured to show the method steps or operation for setting up an "adjustable calculation" according to an embodiment of the invention. According to an embodiment, an adjustable calculation is configured to allow a user to change the calculation parameter(s) that are marked as being adjustable by the user when the calculation is set up. For the exemplary adjustable calculation configured in the FIG. 21, the calculation is for "Health Care Premiums" and has been configured as an "adjustable calculation" using the "Adjustable" check box 2010 in the Timing panel 320. The user has also activated the "Acquisitions wait for # periods", i.e. by clicking check box 2020, and set the wait period to 3 months, i.e. using a scroll box 2030. According to another aspect, the default value is set at 3 months in the scroll box 2030, and unless adjusted by a user the value remains at 3 months. According to another aspect, once a calculation type has been set up as being adjustable, a user can select one of the adjustable calculations using the Employer Editor screen 2200 which is configured with an "Adjustable" tab 2218 as shown in FIG. 22. The Employee Editor comprises a software component or object, configured for example, as a graphical user interface screen or window, that allows as user to add, edit and delete the List of Entities 123 (FIG. 1). The adjustable tab 2218 comprises a "Calculation" drop-down list box 2230 which is configured with one or more calculation types that have been configured as being adjustable. For the example depicted in FIG. 22, the adjustable calculations comprise "Anniversary COLA (Cost Of Living Allowance) Increase [73]", "Health Care Premiums [72]" and "Standard COLA Increase [60]".

Figure 23:
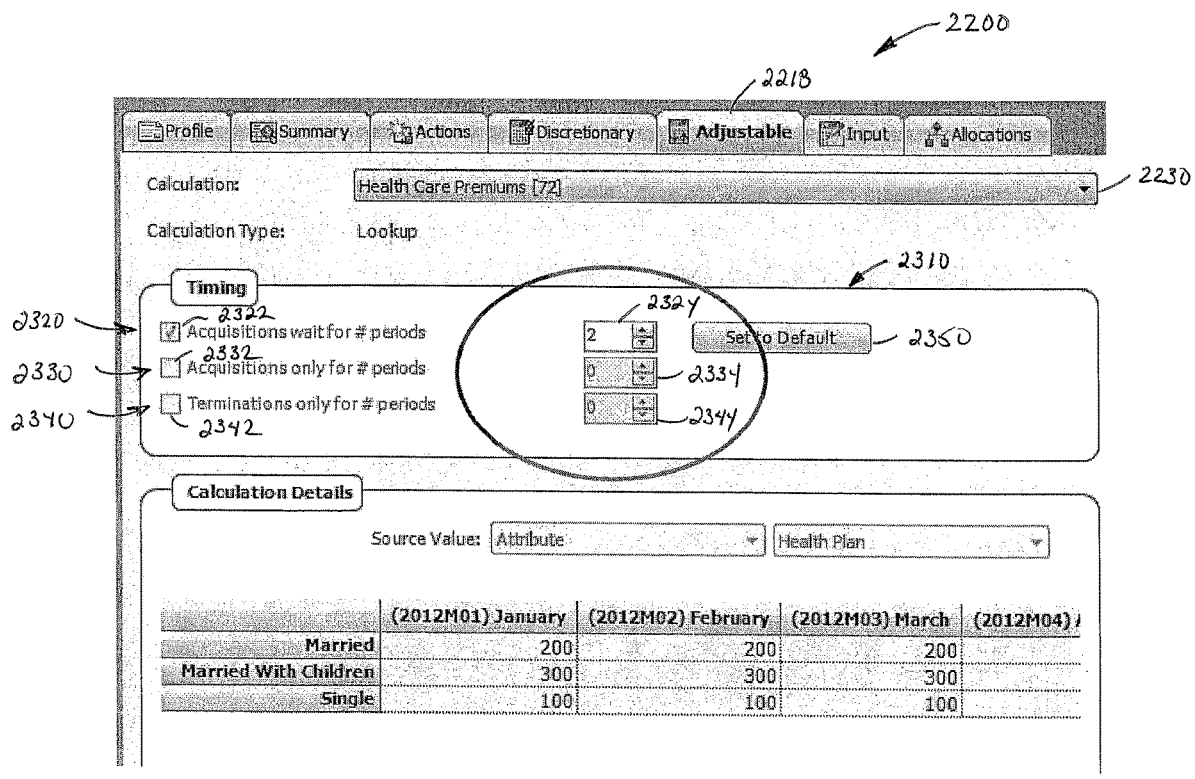

Reference is next made to FIG. 23, which shows a screenshot of the Employee Editor screen 2200 configured with the "Health Care Premiums [72]" adjustable calculation, i.e. selected in the calculation drop-down list box 2230 (FIG. 22). As shown the screen or dialog box for the Adjustable tab 2218 comprises a "Timing" panel indicated generally by reference 2310. The timing panel 2310 is configured to allow a user to change the time scope of a calculation, and according to one aspect includes an "Acquisitions wait for # periods" time scope 2320 comprising a check box 2322 and a scroll box 2324, an "Acquisitions only for # periods" time scope 2330 comprising a check box 2332 and a scroll box 2334, and a "Terminations only for # periods" time scope 2340 comprising a check box 2342 and a scroll box 2344 in the context of a personnel planning application. The timing panel 2310 may also include a "Set to Default" button 2350 which is configured for setting the selected time scope value as the default value (for example, as described above). The Employee Editor screen 2200 is also configured with a "Profile" tab 2210, a "Summary" tab 2212, an "Actions" tab 2214, a "Discretionary" tab 2216, an "Input" tab 2220 and an "Allocations" tab 2222, as described in more detail below.

Figure 24:
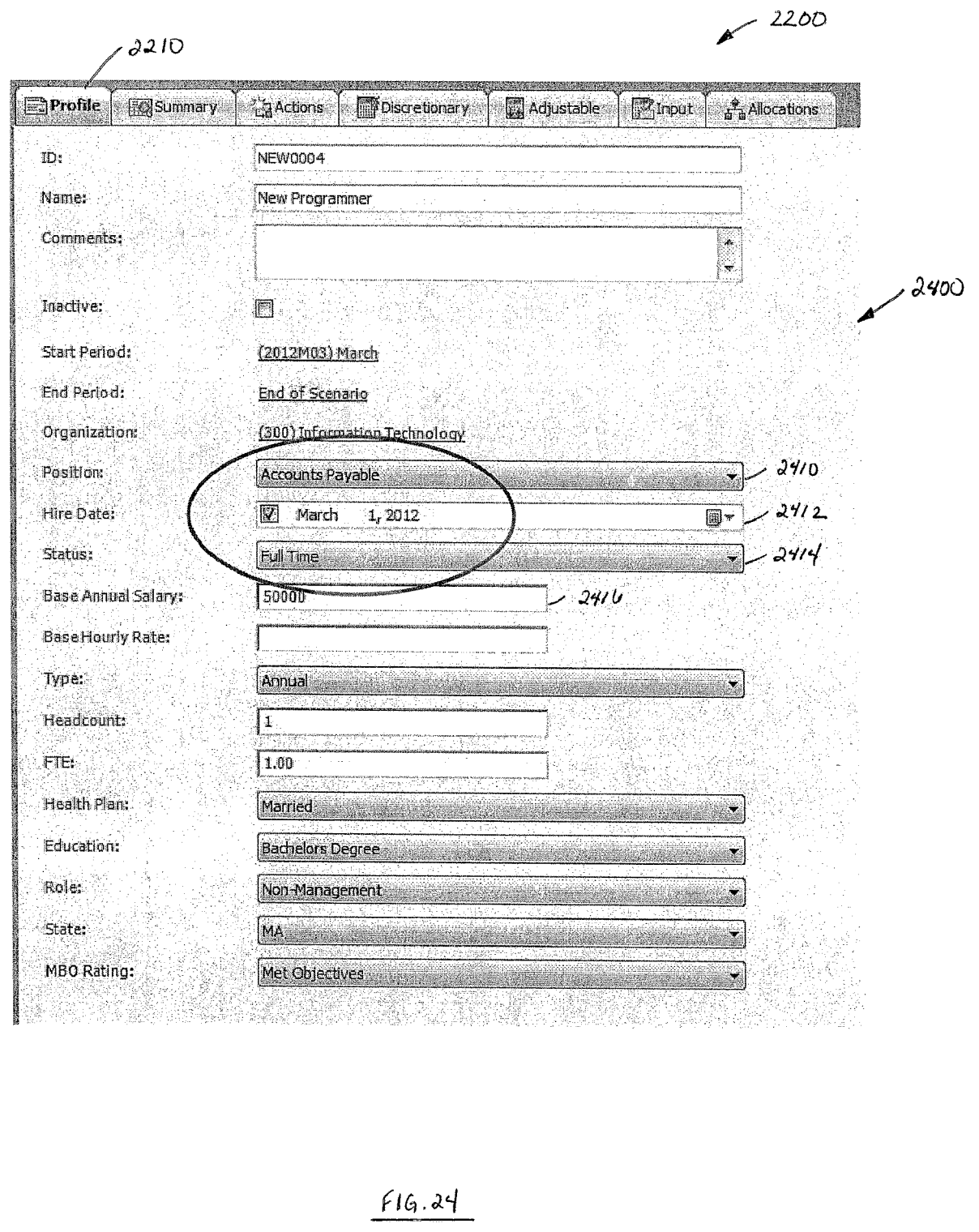

Reference is next made to FIG. 24, which shows a screen shot of a Profile window or panel 2400 generated and displayed by the system in response to the Profile tab 2210 being "clicked" on the Employee Editor screen 2200 (FIG. 22). As shown, the Profile screen 2400 comprises a number of text input boxes or fields and drop-down list boxes which are populated with employee specific information, such as, "Position" in drop-down list box 2410, "Hire Date" in text input box 2412, "Status" in drop-down list box 2414, and "Base Annual Salary" in text input box 2416. For this exemplary employee, "New Programmer", the employee's position is Accounts Payable with a start date of Mar. 1, 2012 as Full Time employee and Base Annual Salary of $50,000.

Reference is next made to FIG. 25, which shows a screen shot of a Summary window or panel 2500 generated and displayed by the system in response to the "Summary" tab 2212 being clicked on the Employee Editor screen 2200 (FIG. 22). According to an embodiment, the summary window 2500 is configured to summarize and display information associated with the "relevant employee". For this exemplary "relevant employee", the setting of the "Acquisitions wait for # periods" 2320 (FIG. 23) is set to two months, which means that according to the policy of the organization, there are no "Health Care Premium" expenses for the months of "March" and "April" as depicted in FIG. 25. The Health Care Premium expense starts in "May" as also shown in FIG. 25.

Figure 26:
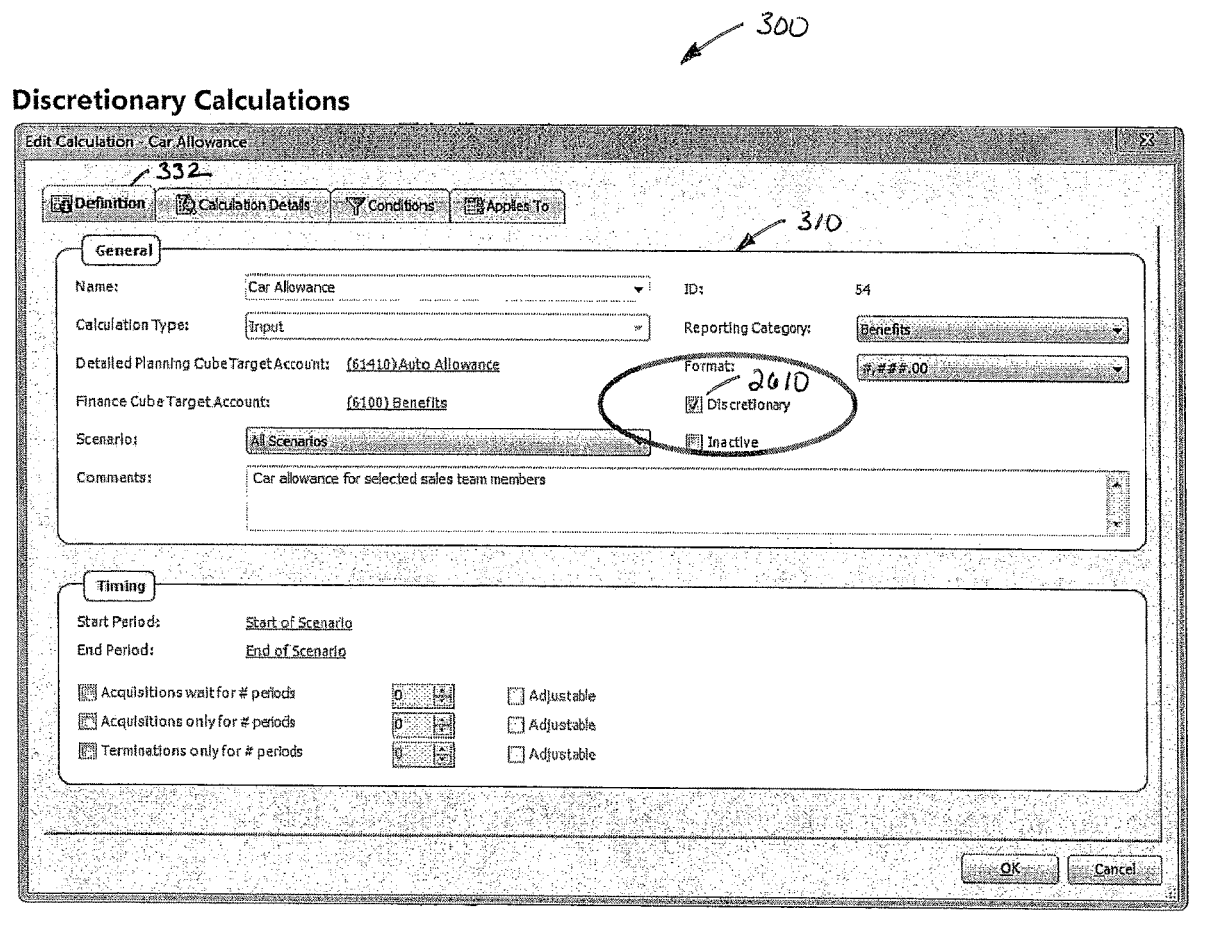
Figure 27:
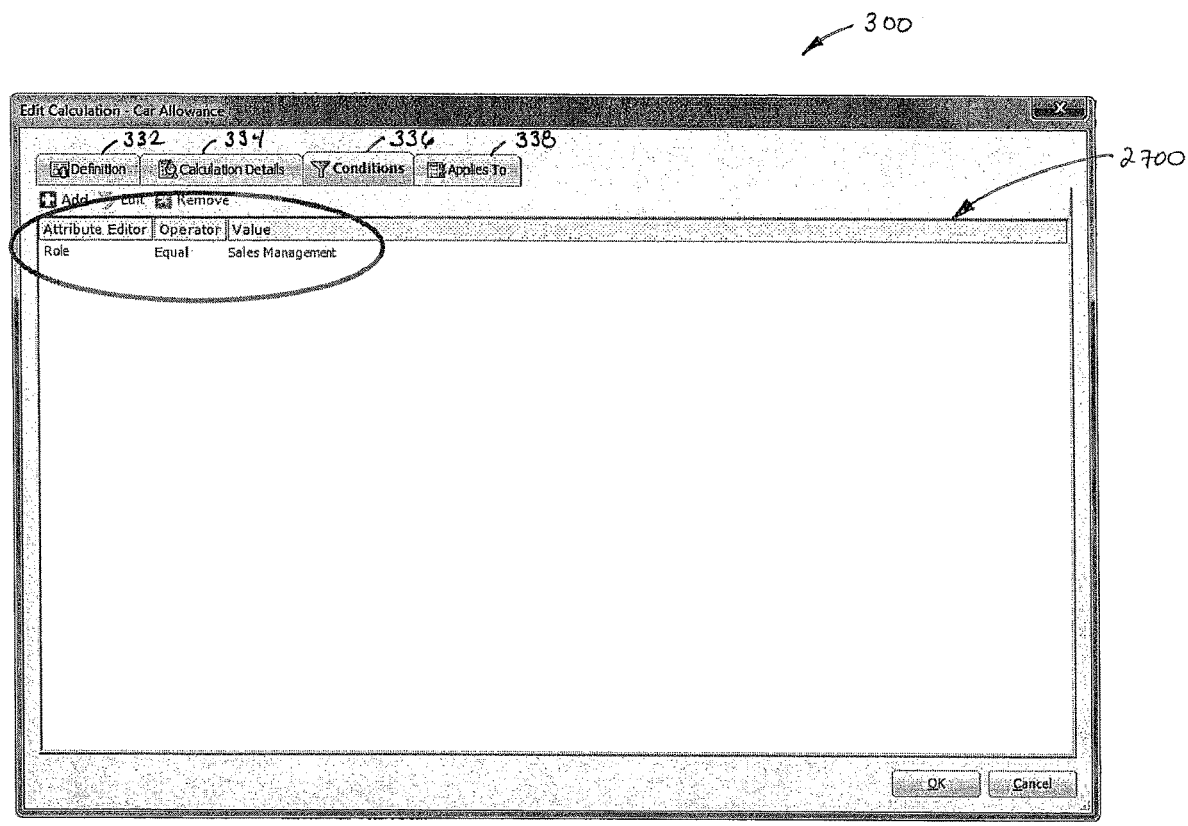
Figure 28:
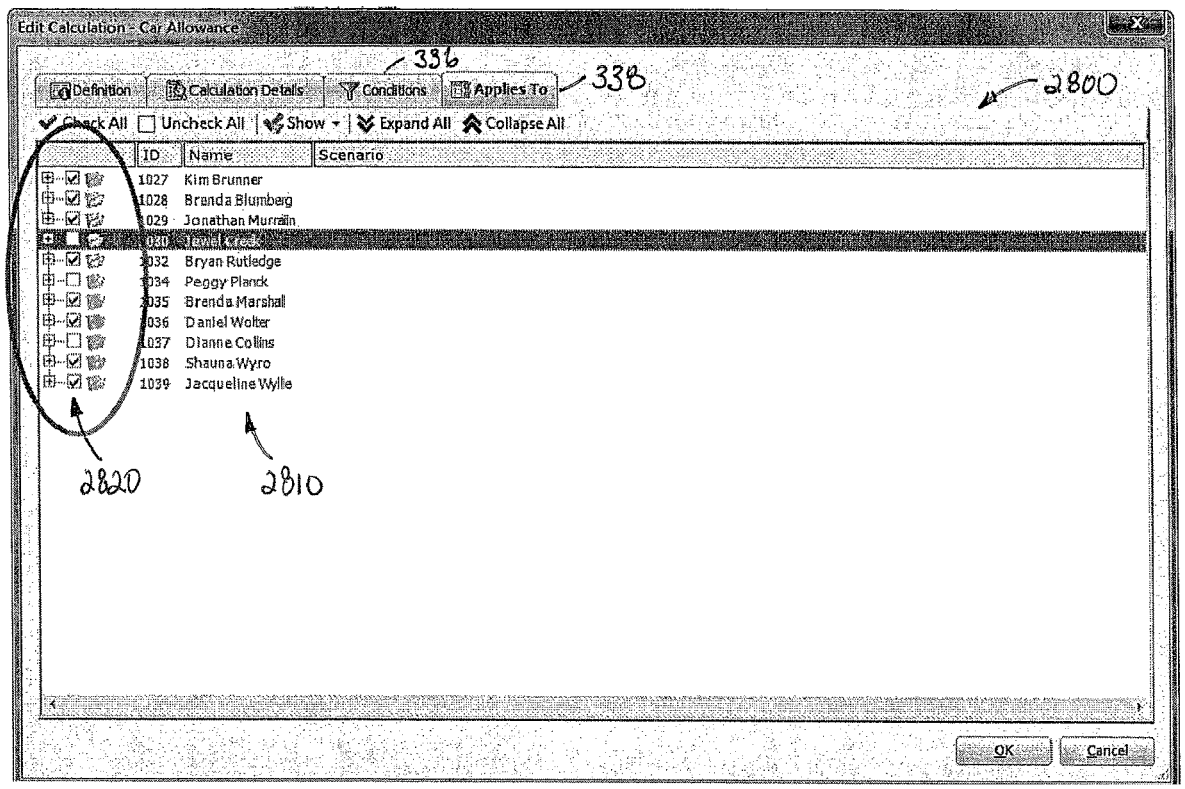
Figure 29:
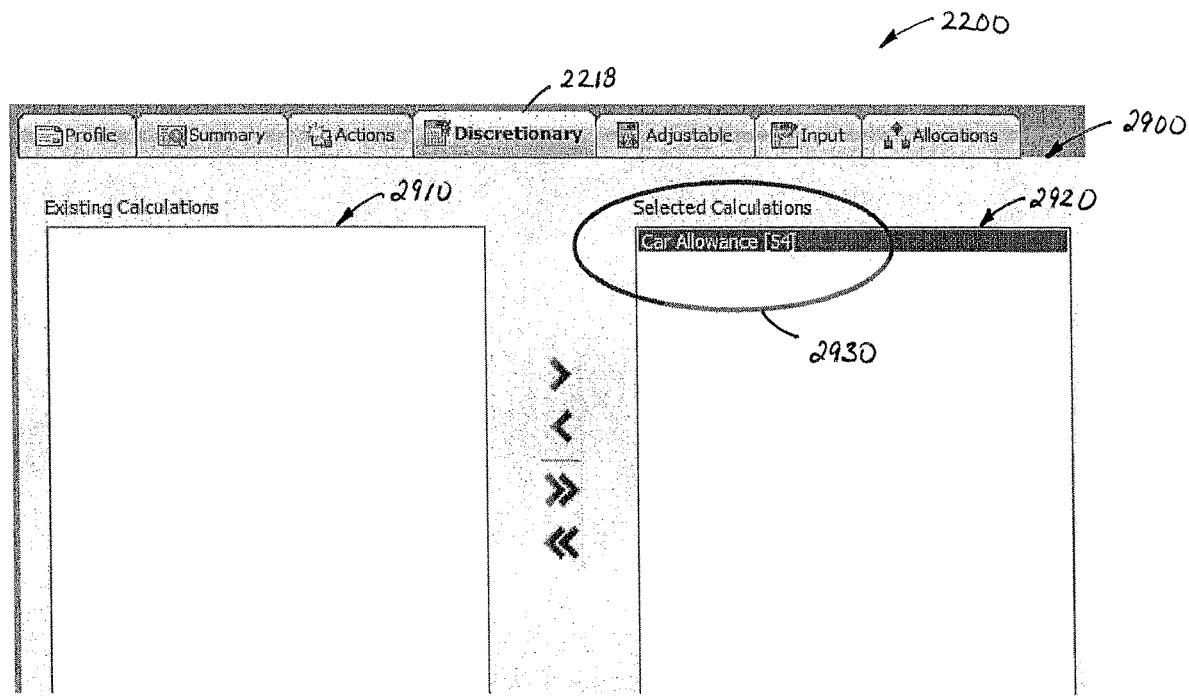

According to an embodiment, the calculation engine 122 (FIG. 1) may be configured to apply calculation(s) to all employees or to apply the calculation(s) to some or a restricted number of employees. According to one aspect, the General definition panel 310 (which is accessed by clicking the "Definition" tab 332) on the Edit Calculation screen 300 is configured with a "Discretionary" checkbox 2610 as shown in FIG. 26. The calculation engine 122 (FIG. 1) is configured to make the calculation being edited a "discretionary calculation" when the checkbox 2610 is clicked, for example, as shown in FIG. 26. According to another aspect, discretionary calculations are applied to employees not just based on conditions, but also on a one-by-one basis. According to another aspect, the calculation engine 122 (FIG. 1) can be configured for a discretionary calculation by using the "Conditions" tab 336, which displays a Conditions screen or panel 2700 of the Edit Calculation screen 300 as shown in FIG. 27. According to this aspect, a discretionary calculation can have one or more associated conditions. For a discretionary calculation to apply to an employee, the employee has to meet the relevant condition(s) as configured as described above and also have the calculation applied on a one-by-one basis. According to another embodiment, the calculation engine 122 (FIG. 1) can be configured to perform discretionary calculations using the "Applies To" tab 338 on the Edit Calculation screen 300. If a calculation has been configured as being discretionary, then the Applies To tab 338 is active or enabled. As shown in FIG. 28, in response to clicking the "Applies To" tab 338, an "Applies To" screen or panel 2800 is generated and displayed (i.e. by the processor 121 and/or calculation engine 122 operating under software control). The "Applies To" screen 2800 as shown is configured to provide a user with the capability to select which employees receive the discretionary calculation from a list of employees that meet the conditions configured in the Conditions screen 2700 under the Conditions tab 336 (for example, as described above). According to an exemplary GUI implementation, the employees are arranged in a vertical column or list 2810 with a checkbox 2820 associated with each of the employees for applying the discretionary calculation. According to another embodiment, the system is configured to identify employees set up with discretionary calculation(s) utilizing the "Discretionary" tab 2218 on the Employee Editor screen 2200, which is configured with a Discretionary Calculations screen or window 2900 as depicted in FIG. 29. The discretionary calculations screen 2900 provides a mechanism for identifying employees (i.e. the employee being edited) receiving discretionary calculations. The discretionary calculations screen 2900 comprises an Existing Calculations panel 2910 configured to display existing calculations (e.g. as active objects) and a Selected Calculations panel 2920 configured to display selected calculations (e.g. configured as active objects). For the example depicted in FIG. 29, the selected discretionary calculation for the employee is "Car Allowance [54]". The discretionary calculations screen 2900 includes controls, e.g. ">", "<", ">>", "<<", for moving discretionary calculation objects the between the panels 2910 and 2920.

Figure 30:
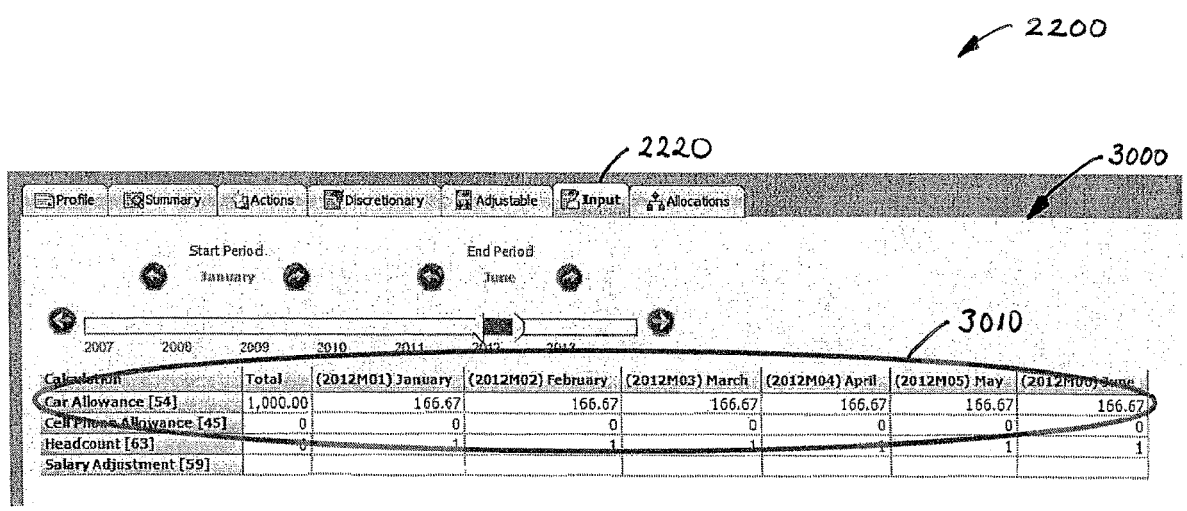
Figure 31:
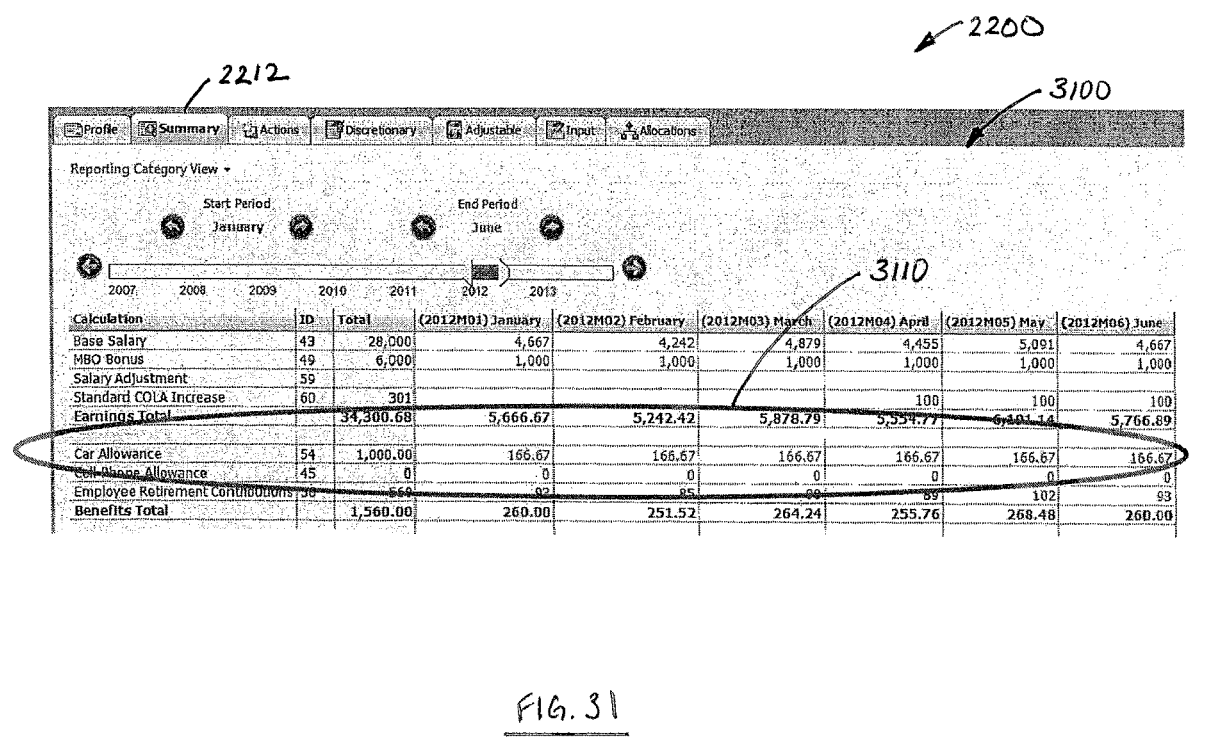

Reference is next made to FIG. 30, and the Employee Editor screen 2200 and the Inputs tab 2220. In response to actuation of the inputs tab 2220, the system is configured to display a screen or window 3000 that allows the user to enter monthly data for all calculations of type "Input" that apply to the entity being edited, as depicted in FIG. 30. The inputs type calculations screen 3000 is configured to allow a user to enter one or more monthly values as shown. According to this aspect, the "Car Allowance" calculation is of the type "Input", and the user can enter or modify individual monthly values as indicated generally by reference 3010 in FIG. 30. Because the car allowance discretionary allowance has been applied to the employee being edited in the Employee Editor screen 2200, the system is configured to display a Summary calculations screen or window 3100 as depicted in FIG. 31, in response to the user actuating the Summary tab 2212. As shown, the system has displayed the values for the "Car Allowance" calculation and also added them to the values for the "Benefits Total" calculation, as indicated by reference 3110.

Figure 32:
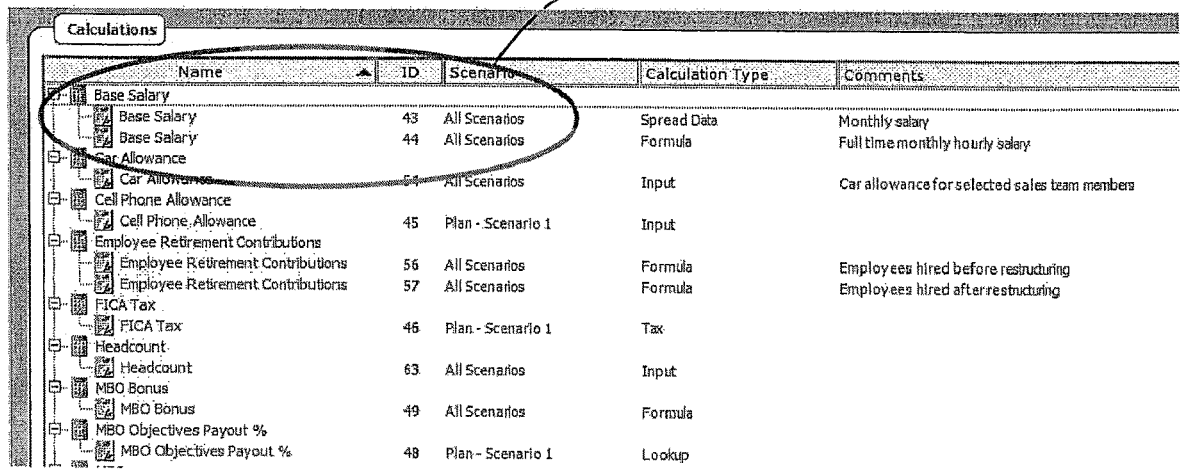
FIG. 32 is an exemplary screen shot of the detailed planning calculations screen or window configured with the "same name" feature according to an embodiment of the present invention.

According to another embodiment, the system is configured (e.g. the processor 121 and the calculation engine 122) to process between calculations having the same name. It will be appreciated that in certain applications, such as personnel planning, calculations and parameters will have the same or generic names, but may comprise very different calculations or parameters. For example, base salary will be different for an hourly worker and a salaried employee. Reference is made to FIG. 32, which shows the Calculations screen configured with the same names function according to an embodiment of the invention and indicated generally by reference 3200. For the example, shown in FIG. 32, there are multiple calculations named "Based Salary" as indicated generally by reference 3210. However, according to another aspect, the calculation engine 122 (FIG. 1) may be configured to reference calculations from other calculations. As a result, the system is configured so that calculations having the same name are defined for multiple contexts, i.e. while multiple calculations can have the name "Base Salary", there is only one definition of "Base Salary" for any one employee.

It will be appreciated that each calculation has a scope and the scope may comprise a combination of: (1) potentially multiple values of "Time Period"; (2) potentially multiple values of "Scenario"; and/or (3) potentially multiple values of each user-defined "Employee Attribute", for example, as also described above. For instance, a calculation can apply to all months (i.e. time scope), for Plan 9 (i.e. scenario scope), for all "Departments" (i.e. scope of "Department" Employee Attribute), for all Job Functions (i.e. scope of "Job Function" Employee Attribute), for all married employees (i.e. scope of "Marital Status" Employee Attribute). According to another aspect, calculations having the same name are configured with a non-overlapping scope. It will be appreciated that if calculations having the same name, the results for overlapping time period(s) (and scenario(s)) would be ambiguously defined.

Figure 33:
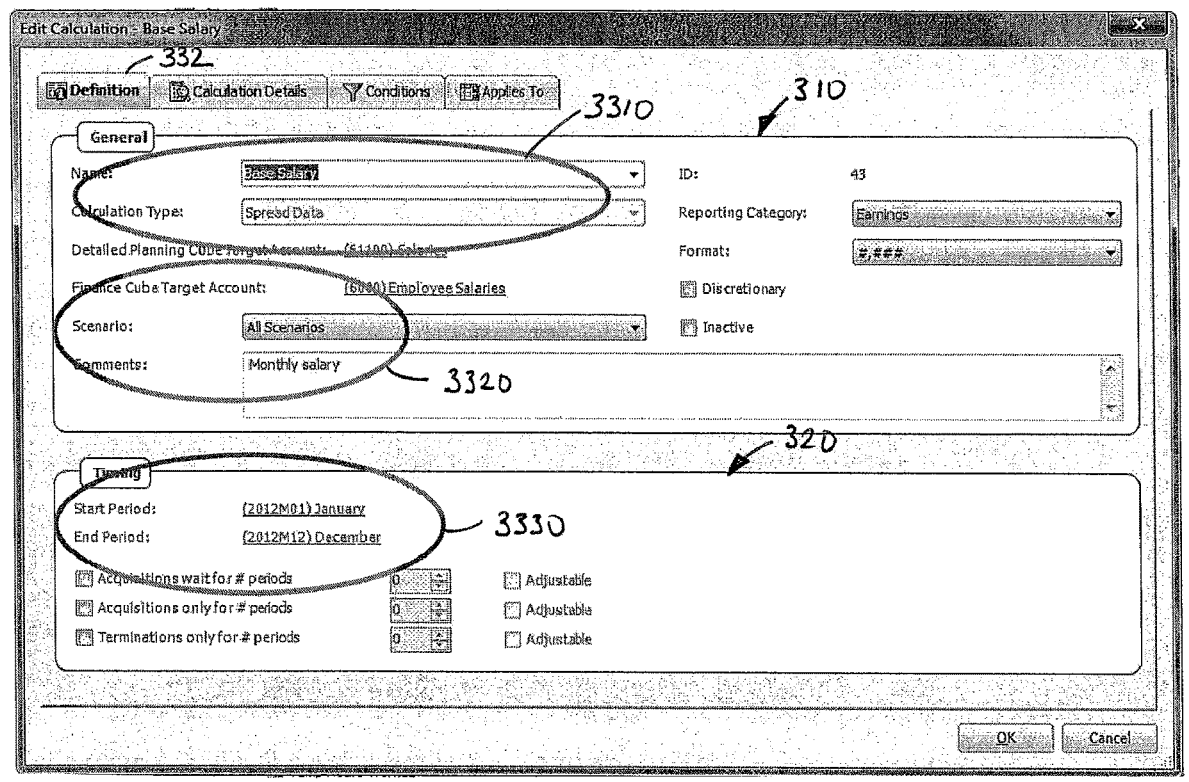
FIGS. 33 to 37 are exemplary screen shots of the "Edit Calculation" window or panel configured with the "same name" feature according to an embodiment of the present invention

Reference is next made to FIG. 33, which shows the Edit Calculation screen 300 and a Definition screen 3300 accessed through the Definition tab 332. As shown, the "Base Salary" is defined in the General panel 310. The Base Salary definition for this employee has "Spread Data" calculation type 3310 and an "All Scenarios" scenario scope 3320. In the comments, the base salary is labeled as "Monthly Salary". In Timing panel 320, the time scope of the "Base Salary" calculation is defined with a "Start Period" of January 2012 and an "End Period" of December 2012, as indicated generally by reference 3330.

Figure 34:
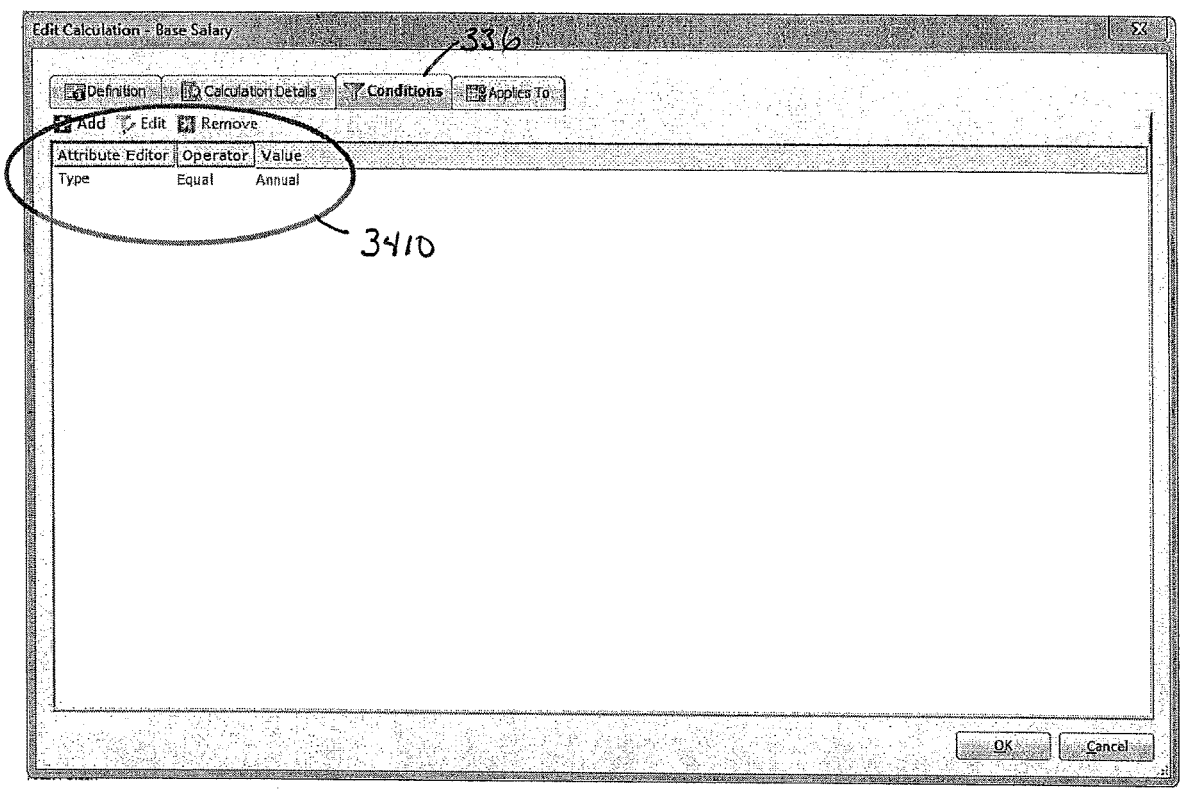

Reference is made to FIG. 34, which shows a Conditions window or dialog box 3400 in the Edit Calculation screen 300 (accessed using the Conditions tab 336). The scope(s) for all Employee Attributes are defined under the Conditions tab 336 (as also described above). For the example depicted in FIG. 33, the calculation comprises a "Spread Data" and is applied to employees that have the attribute "Type" equal to "Annual" as indicated generally by reference 3410. The "Type" employee attribute comprises a list attribute (i.e. with specified text values) as described above. The scope for this "Type" attribute is "Annual". According to another aspect, the calculation engine 122 (FIG. 1) is configured to define the scope as "All" for all employee attributes, i.e. the calculation applies for all values of each employee attribute.

Figure 35:
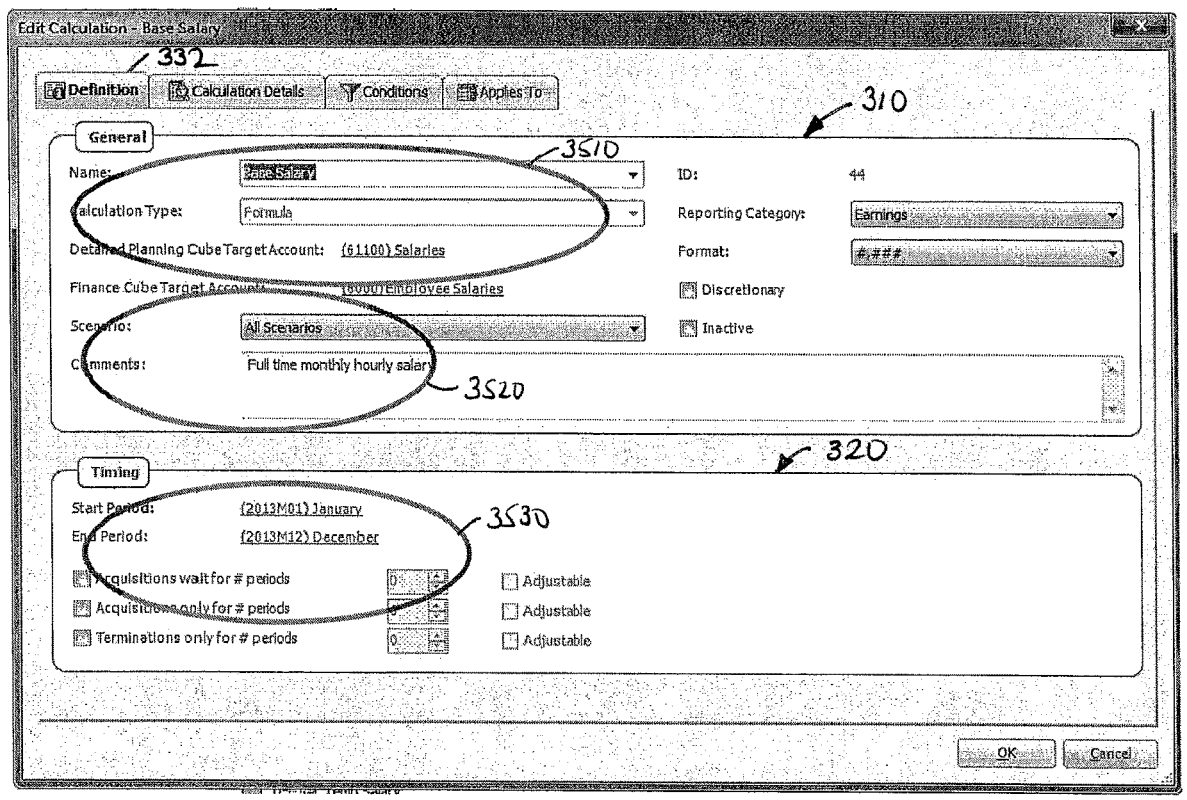
Figure 36:
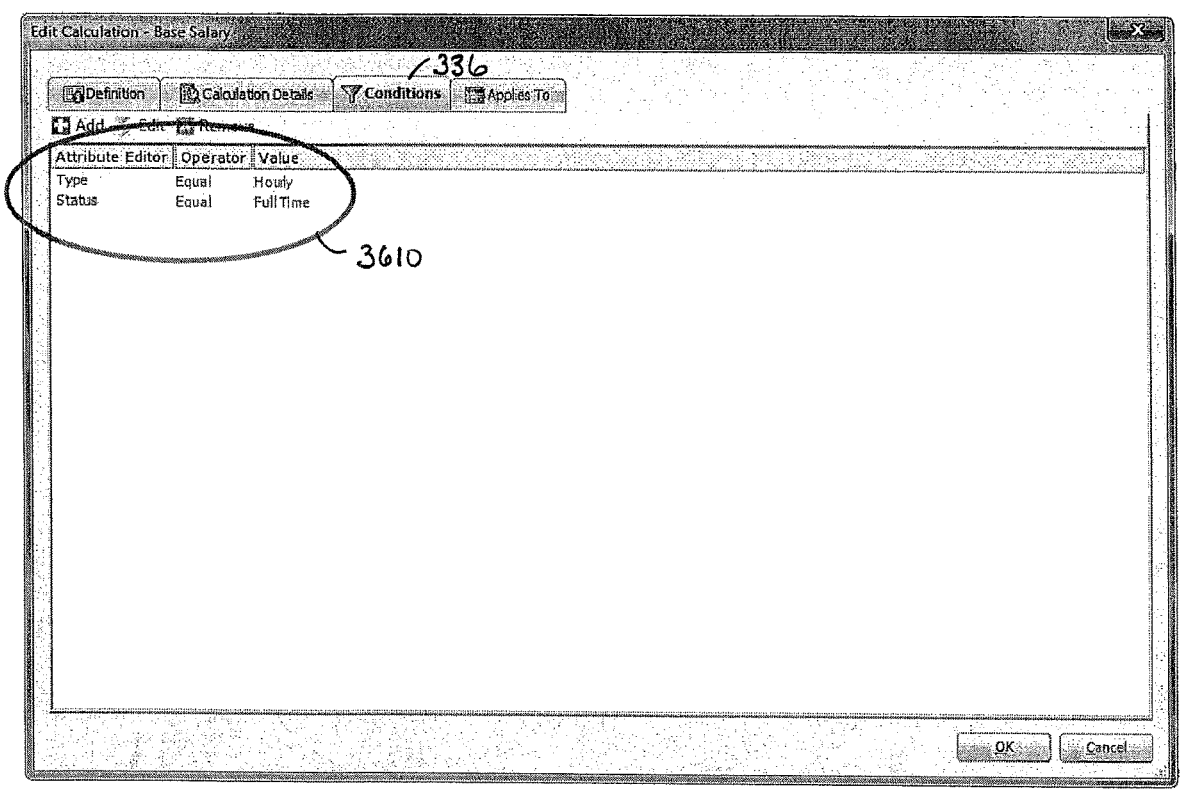

Reference is next made to FIG. 35, which shows an Edit Calculation screen 300 configured for defining another same name calculation, "Base Salary". The calculation has the name, "Base Salary", and is defined with type "Formula", as indicated generally by reference 3510 in the General panel 310. The scenario for this "Base Salary" calculation is "All Scenarios" and the Comments comprise "Full time monthly hourly salary", as indicated generally by reference 3520. The time scope for the calculation is defined in the Timing panel 320 and for this Base Salary calculation, the time scope is January 2012 to December 2012, as indicated generally by reference 3530. Reference is next made to FIG. 36, and a screen or dialog box 3600 for the Conditions tab 336 in the Edit Calculation screen 300, which is configured for this Base Salary calculation definition. As indicated generally by reference 3610, this Base Salary calculation is configured to apply to employees set up with a "Type" attribute equal to "Hourly" and a "Status" attribute equal to "Full Time". In other words, the Type scope and the Status scope for this calculation are "Hourly" and "Full Time", respectively. It will be appreciated that this calculation, "Base Salary", can have the 'same name' as the previous calculation, "Base Salary", because the calculation is configured so that there is no overlap between the conditions. For instance, the employee type attribute is either "Annual" or "Hourly", but cannot be both. Accordingly, the same name calculation, Base Salary, can be defined for all employees in the organization.

Figure 37:
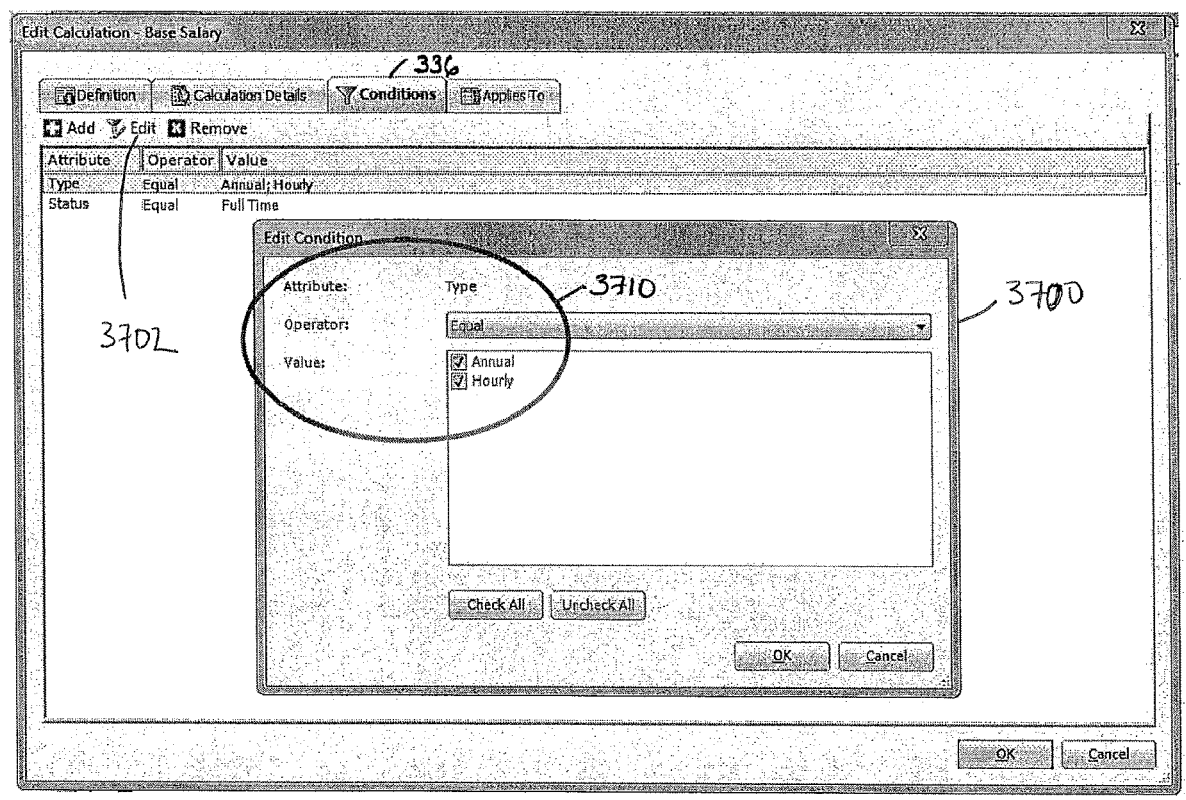

Reference is next made to FIG. 37, which shows the Edit Calculation screen 300 and in particular an Edit Condition screen or window 3700 which is invoked by clicking the Conditions tab 336 (and the "Edit" button 3702). For the exemplary calculation, the conditions for the Base Salary calculation (or formula) have been configured and will be applied to employees having employee Type attribute equal to "Hourly" and to employees having employee Type attribute equal to "Annual", as indicated generally by reference 3710. The Type scope is now "Annual" and "Hourly".

Figure 38:
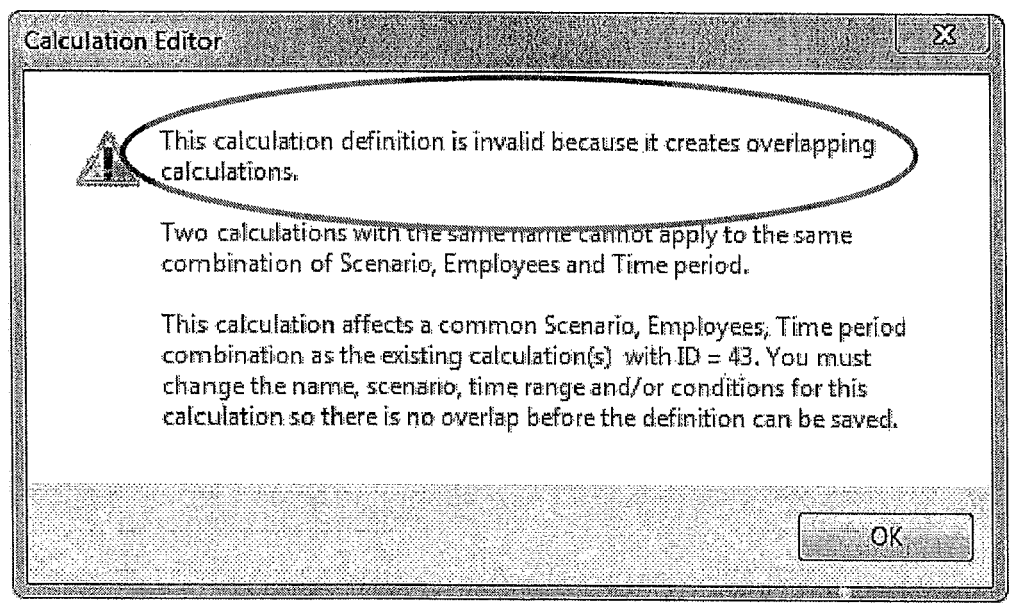
FIG. 38 is an exemplary screen of a Calculation Editor dialog box generated according to an aspect of the "same name" feature according to an embodiment of the present invention.

When a user attempts to save a same name calculation or formula configuration, the system is configured (e.g. logic embodied in the software or code executed by the processor 121 and/or calculation engine 122) to check if the scope overlaps or intersects with the scope with another calculation having the same name. If the system detects an overlap, a Calculation Editor dialog box 3800 having the form as shown in FIG. 38 is displayed to advise the user. According to an embodiment, the calculation engine 122 (FIG. 1) is configured to execute the following algorithm for same name calculations:

$$\exists b \text{ such that} \{X_a \cap X_b\} \neq \emptyset$$

Where b is an existing calculation, a is the calculation being saved, $X_a$ is the set of all (n+2) tuples (i.e. combinations) having the form $(T_a, S_a, A_{a,1}, A_{a,2}, \ldots, A_{a,n})$, where n is the number of Employee Attributes, $T_a$ is a member of the Time scope of calculation a, $S_a$ is a member of the Scenario scope of the calculation a and $A_{a,n}$ is a member of the scope of the $n^{th}$ Employee Attribute of calculation a; and $X_b$ is the set of all (n+2)-tuples (i.e. combination) of the form $(T_b, S_b, A_{b,1}, A_{b,2}, \ldots A_{b,n})$, where $T_b$ is a member of the Time scope of calculation b, $S_b$ is member of the Scenario scope of calculation b and $A_{b,n}$ is a member of the scope of the $n^{th}$ Employee Attribute of calculation b.

According to another aspect, the calculation engine 122 (FIG. 1) is configured to perform a number of pre-programmed calculations. In the context of a detailed planning application for personnel, the calculation engine 122 is configured to execute 14 types of calculations. The 14 calculations according to an embodiment are listed in the Calculation Type 312 drop-down list box as shown in FIG. 4 as described above.

Figure 39:
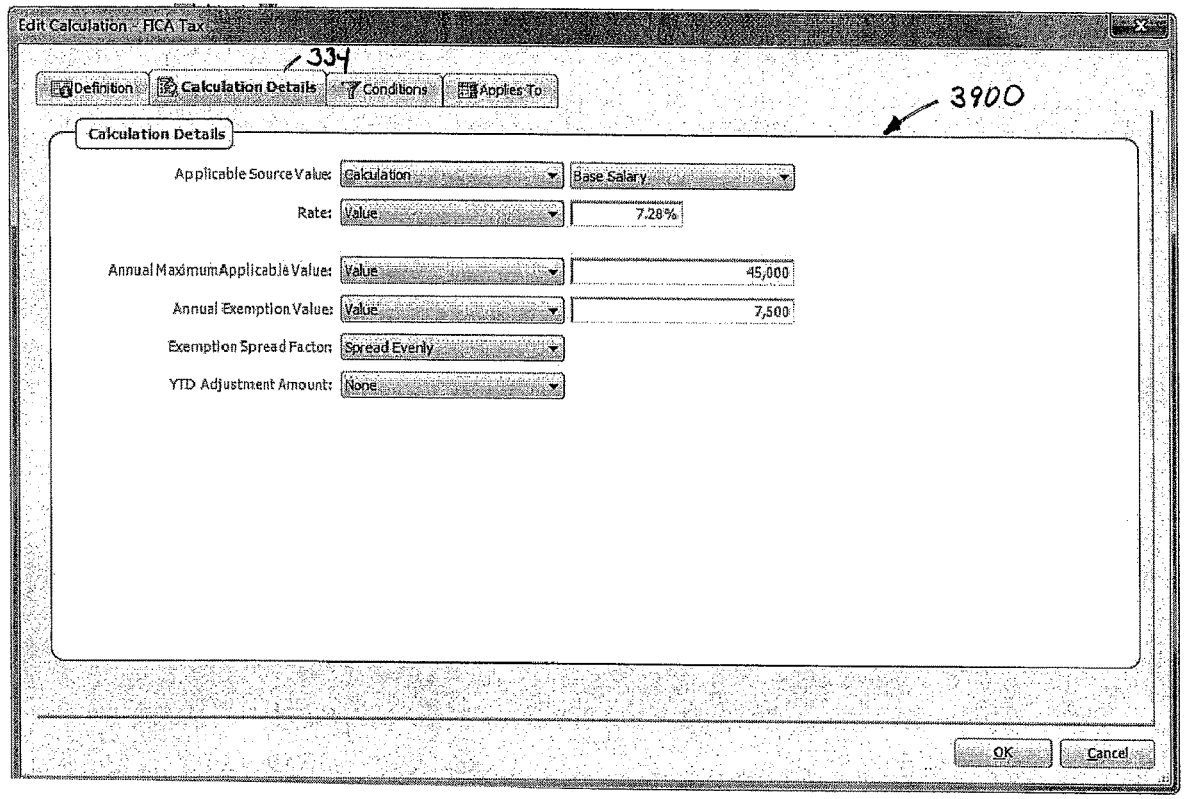
FIG. 39 is an exemplary screen shot of an "Edit Calculation" window or panel accessed from the Calculation Editor screen (e.g. using the Calculation Details Tab) and configured for an exemplary FICA Tax calculation.

Reference is made to FIG. 39, which shows the Edit Calculation screen 300 and in particular the Calculation Details screen configured for a tax calculation indicated generally by reference 3900 and accessed using the Calculations Details tab 334. In North American, payroll taxes tend to be complicated and comprise different payroll taxes, such as FICA, SUTA, CPP and EI, each of which will have its own characteristics. The monthly calculated value is:

$$\left(SV - \left(\frac{AEA}{12}\right)\right) \times TR$$

Where SV is the monthly source value, AEA is the annual exemption amount and TR is the tax rate. In addition, the monthly values are adjusted so that the cumulative amount for any one calendar year is not more than:

((AMAV−AEV−YAA)×TR)

Where AMAV is the Annual Maximum Applicable Value, AEV is the Annual Exemption Value, TR is the tax rate and YAA is the Yearly Adjustment Amount.

Reference is next made to FIG. 40, which shows a screen shot of the Summary tab 2212 in the Employee Editor screen 2200 for the results of a tax calculation indicated generally by reference 4000. In this exemplary implementation, the calculation comprises a FICA type calculation and a SUTA type calculation, with the results indicated generally by reference 4010. In this example, the FICA tax calculation has been executed to be 7.28% of each month's "Base Salary" (less a monthly exemption value of one twelfth of 7,500 or 625) up to an annual maximum of 7.28% of 45,000 less 7,500 or 2,730. For example, the January value for FICA is determined as follows:

(13.333−(7,500/12))×7.28% or 925

Figure 41:
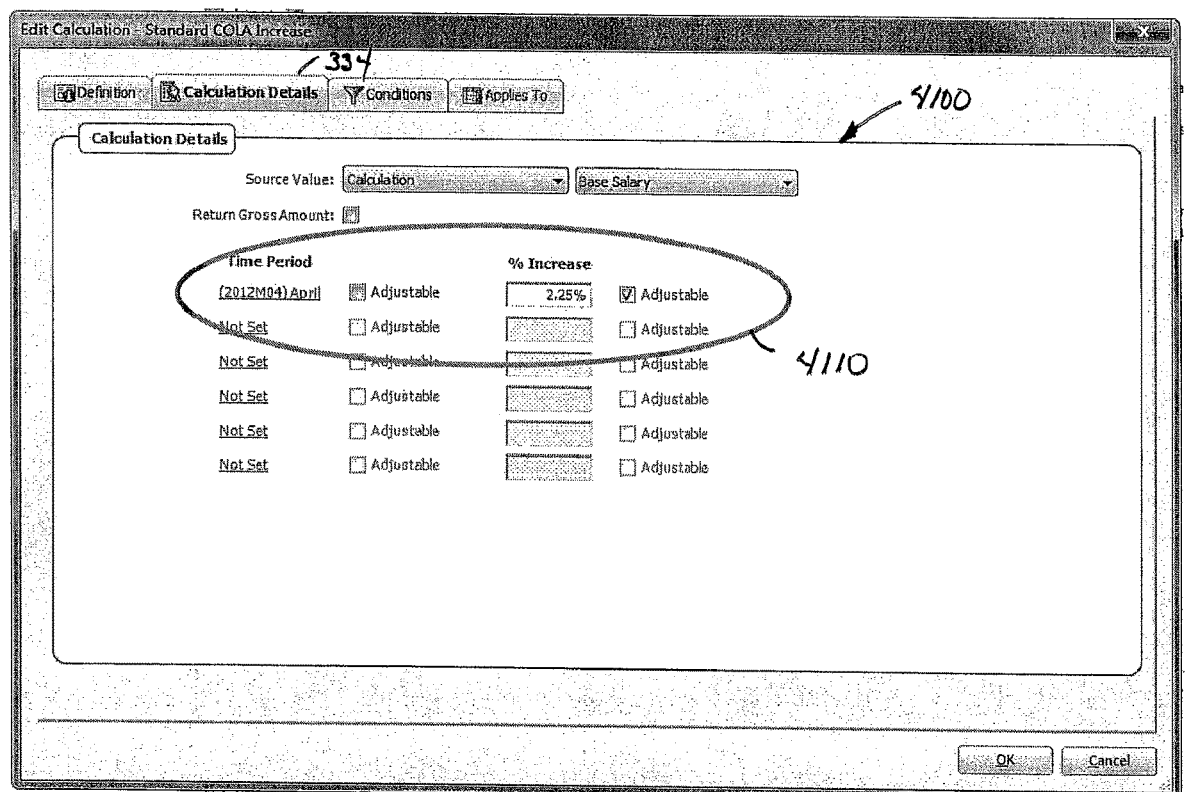
FIG. 41 is an exemplary screen shot of an "Edit Calculation" window or panel accessed from the Calculation Editor screen (e.g. using the Calculation Details Tab) and configured for setting up an exemplary salary "Standard Increase" calculation.

Reference is next made to FIG. 41, which shows a screen shot of the Calculation Details tab 334 in the Edit Calculation screen 300 indicated generally by reference 4100. The "Standard Increase" calculation is configured to allow a user to specify how a time vector can be increased (or inflated) based on specified inflation values and time periods. In this example, the user has specified an increase of 2.25% for April 2012 and the "Adjustable" parameter check box has been activated, as indicated generally by reference 4110. According to an embodiment, the calculation engine 122 (FIG. 1) is configured to generate a time vector that contains the cumulative inflation rates that to be added to the source value, as follows:

$$CIR_n = \prod_{i=1}^{n} (1 + IR_i) - 1$$

Where $CIR_n$ is the cumulative inflation rate at period n and $IR_i$ is the inflation rate (i.e. "% Increase") at period i. The Source Value time vector is then multiplied by the cumulative inflation rate time vector. If the "Return Gross Amount" checkbox is checked, then this time vector is the result of the calculation. Otherwise, the calculation engine 122 (FIG. 1) is configured to subtract the Source Value time vector from the time vector to determine the result of the calculation, i.e. the increases due to applying this calculation to the Source Value vector.

Figure 42:
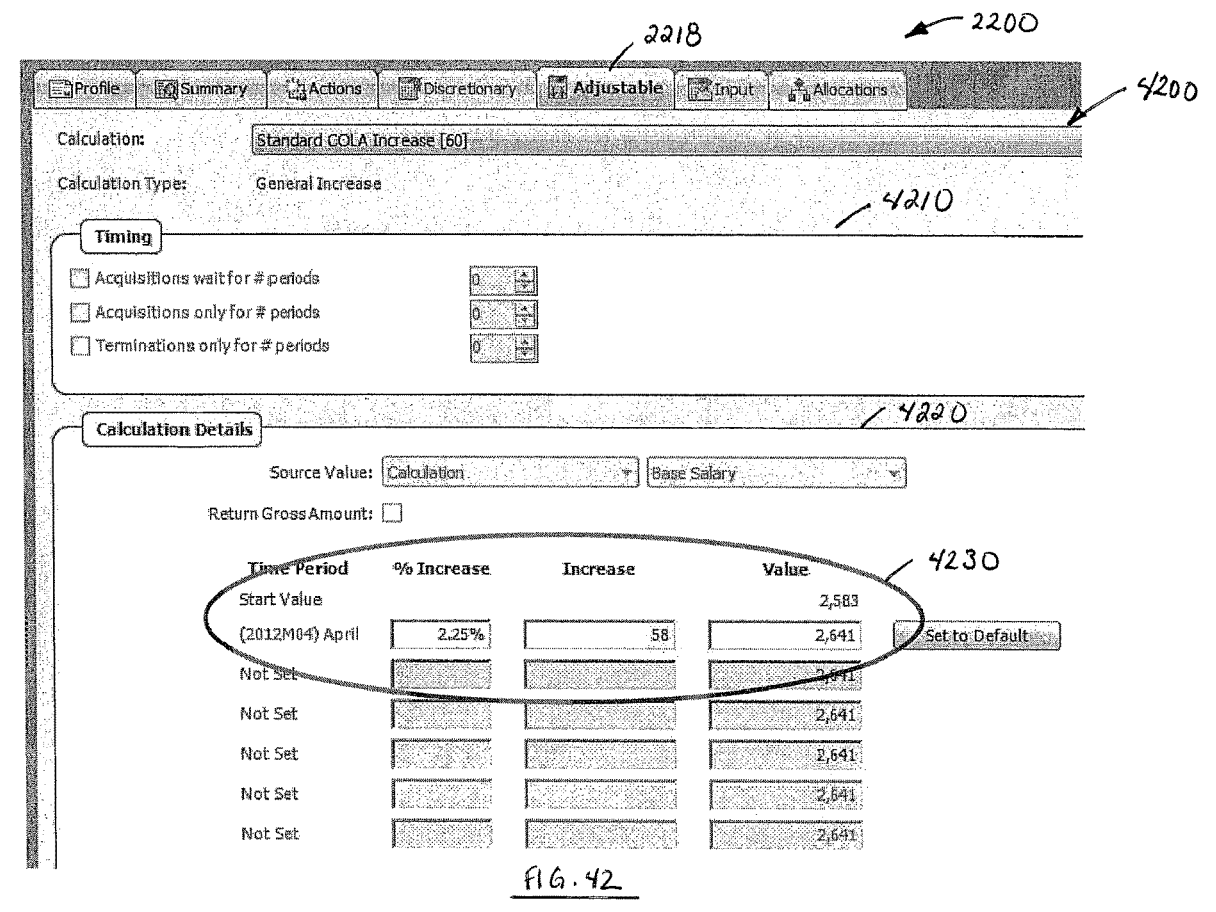
Figure 43:
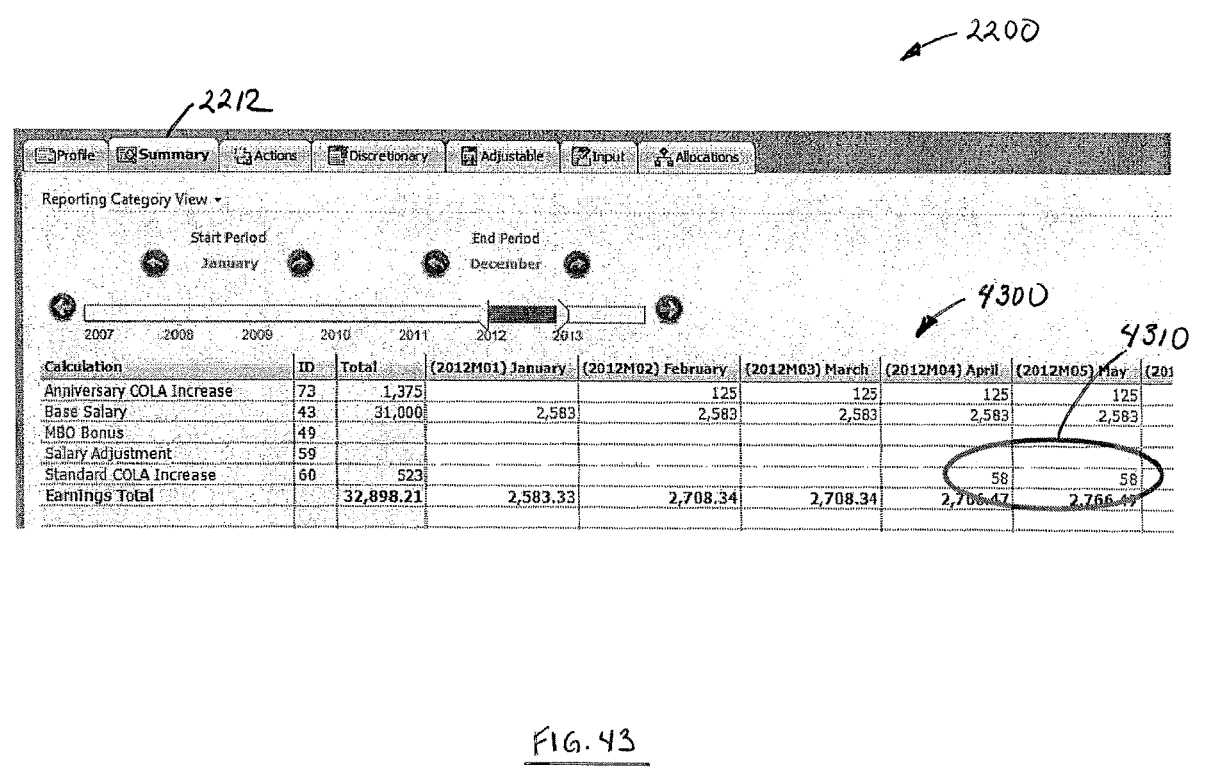

Reference is next made to FIG. 42, which shows a screen shot of the Employee Editor screen 2200 configured with an Adjustable calculations screen or window 4200. The Adjustable calculation screen 4200 is accessed using the Adjustable tab 2218 and comprises a Timing panel 4210 and a Calculation Details panel 4220 according to an embodiment. As shown in FIG. 42, the Adjustable calculations screen 4200 is configured for a standard increase type calculation, e.g. a "Standard COLA Increase" calculation (FIG. 4). For this exemplary cost of living adjustment calculation, the "% Increase" parameter has been configured as being adjustable, and the adjustable calculations screen 4200 is configured to allow a user to edit any one of the parameter input fields: "% Increase", "Increase" or "Value" as indicated generally by reference 4230. When one parameter value is changed, the system is configured to automatically update or calculate values for the other two parameters. According to another aspect, the calculation engine 122 (FIG. 1) is configured to display or render the results of the standard increase calculation, for example, as shown in the Summary screen 4300 for the Employee Editor screen 2200 in FIG. 43. In this example, the "Standard COLA Increase" calculation has been applied to April and subsequent months as indicated generally by reference 4310.

Figure 45:
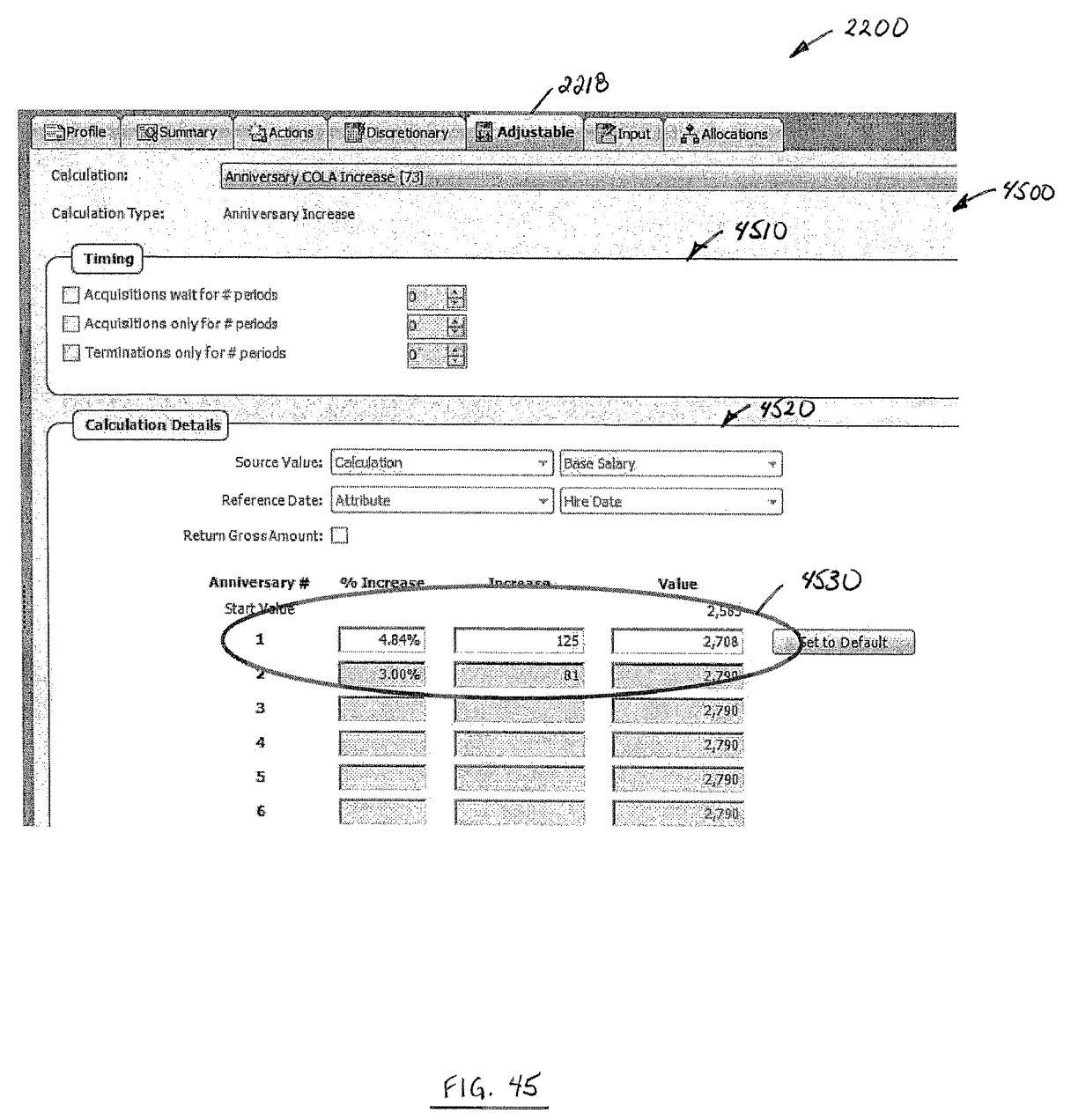
Figure 46:
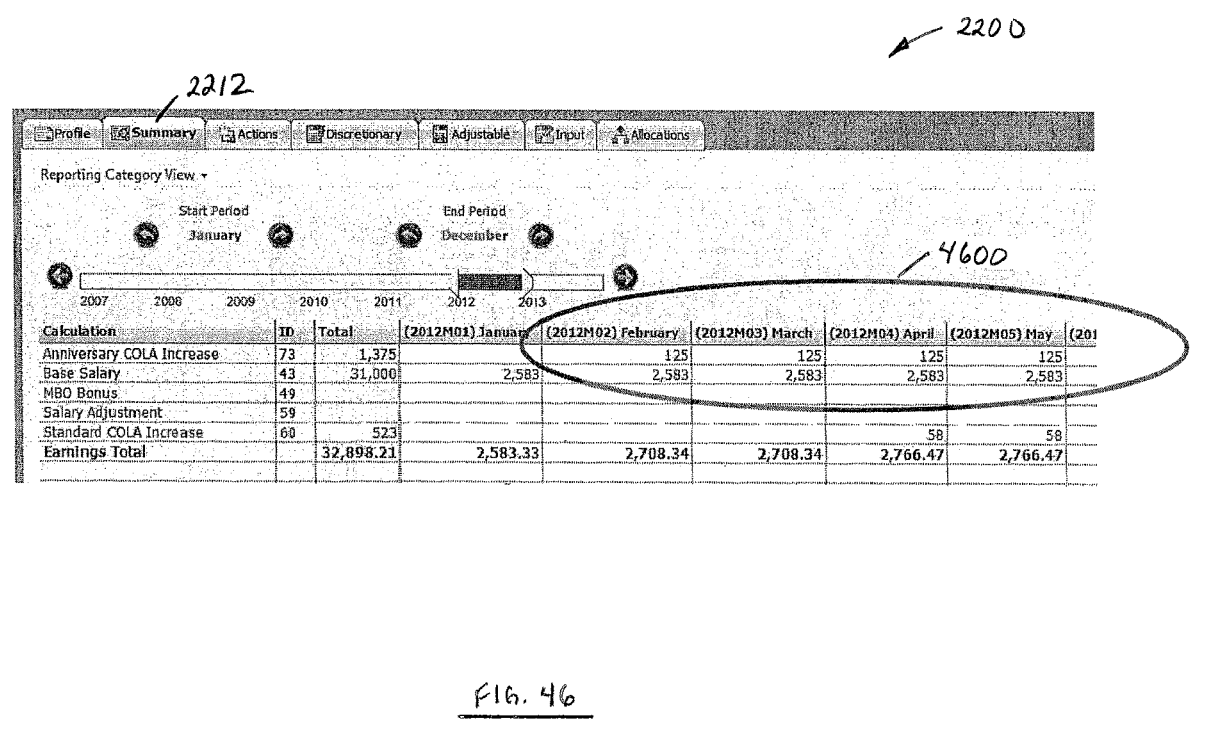

In FIG. 45, the Employee Editor screen 2200 is shown with an Adjustable calculation screen 4500 configured for an anniversary increase calculation, e.g. an "Anniversary COLA Increase" calculation. Because the "% Increase" for the first anniversary is configured as adjustable, the calculation engine 122 (FIG. 1) allows the user to adjust or edit any one of the "% Increase", "Increase" or "Value" parameters, for example, as described above. The results for the "Anniversary Increase" calculation are generated by the calculation engine and also graphically displayed on the Summary screen under the Summary tab 2212, for example as shown in FIG. 46, and indicated generally by reference 4600.

Figure 44:
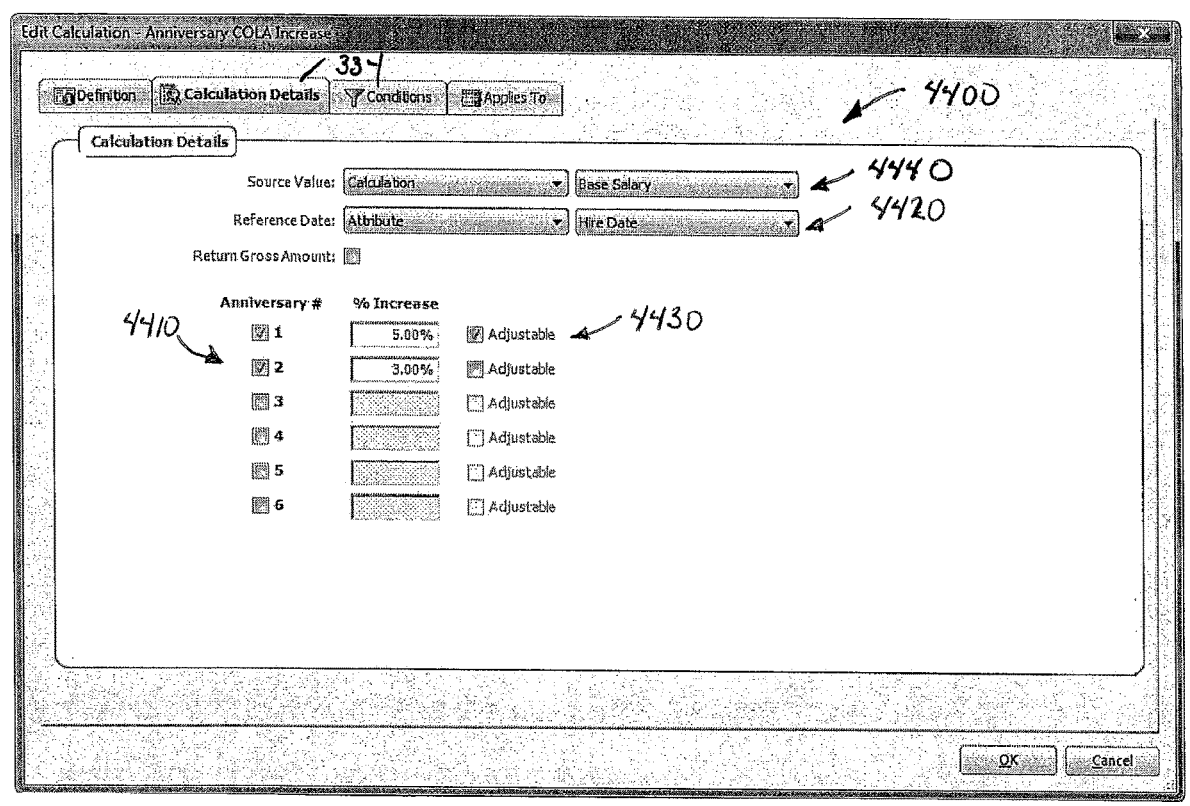
FIG. 44 is an exemplary screen shot of an "Edit Calculation" window or panel accessed from the Calculation Editor screen (e.g. using the Calculation Details Tab) and configured for setting up an exemplary salary "Anniversary Increase" calculation.

Reference is next made to FIG. 44, which shows the Edit Calculation screen 300 with a Calculation Details screen 4400 configured for an "Anniversary Increase" calculation type and accessed using the Calculations Details tab 334. For the Anniversary Increase calculation type, the Calculation Details screen 4400 is configured to allow a user to specify how a time vector can be increased (i.e. inflated) based on specified inflation values and/or time periods comprising anniversaries of a date. For the example depicted in FIG. 44, the user has specified an increase for the first two anniversaries 4410 of an employee's "Hire Date" 4420 and the "% Increase" parameter for the first anniversary has been flagged as being "Adjustable" 4430. The calculation engine 122 (FIG. 1) is configured to generate a time vector comprising cumulative inflation rates that are applied to the "Source Value", in this example, "Base Salary" 4440.

Figure 47:
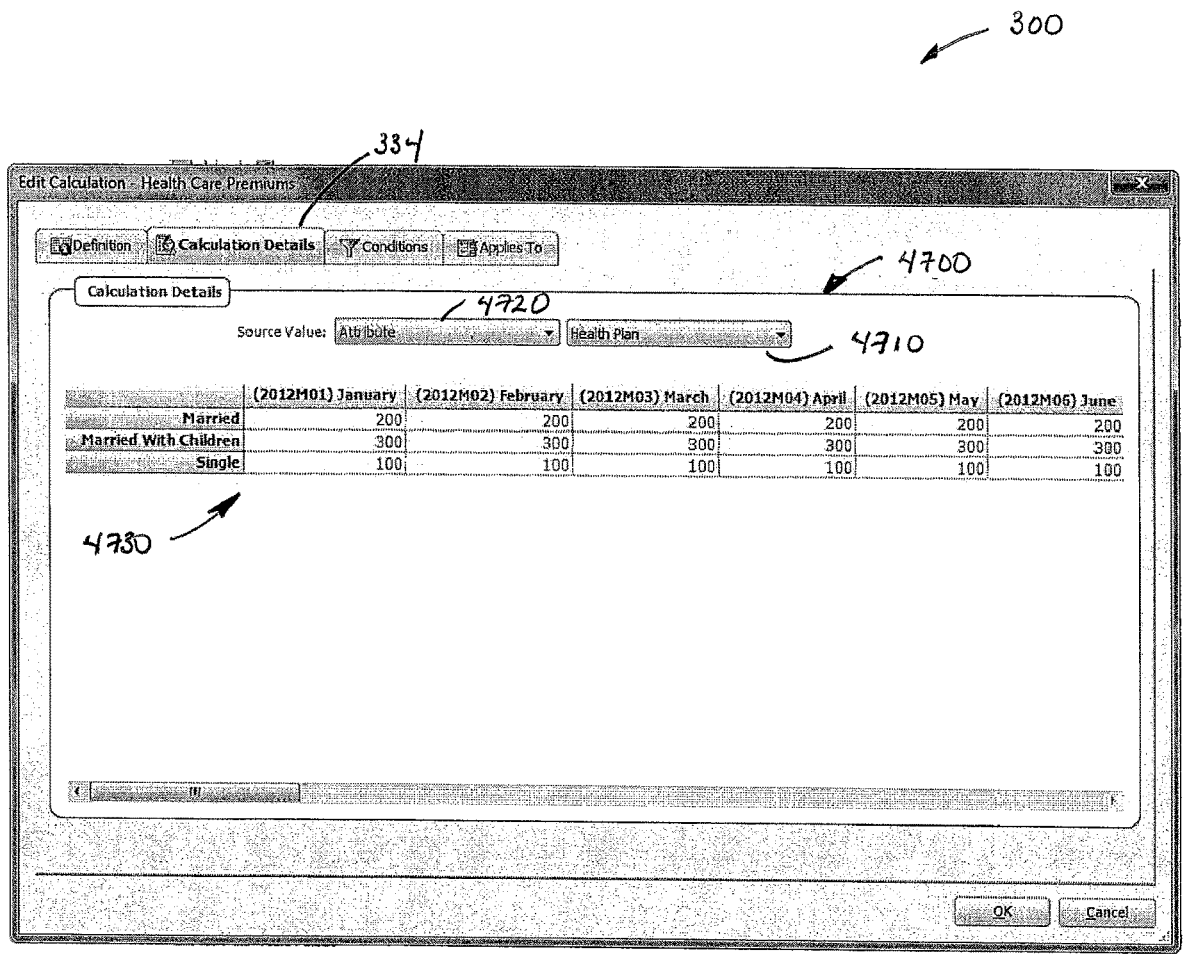
FIG. 47 is an exemplary screen shot of an "Edit Calculation" window or panel accessed from the Calculation Editor screen (e.g. using the Calculation Details Tab) and configured for an exemplary "Health Care Premium" calculation.
Figure 48:
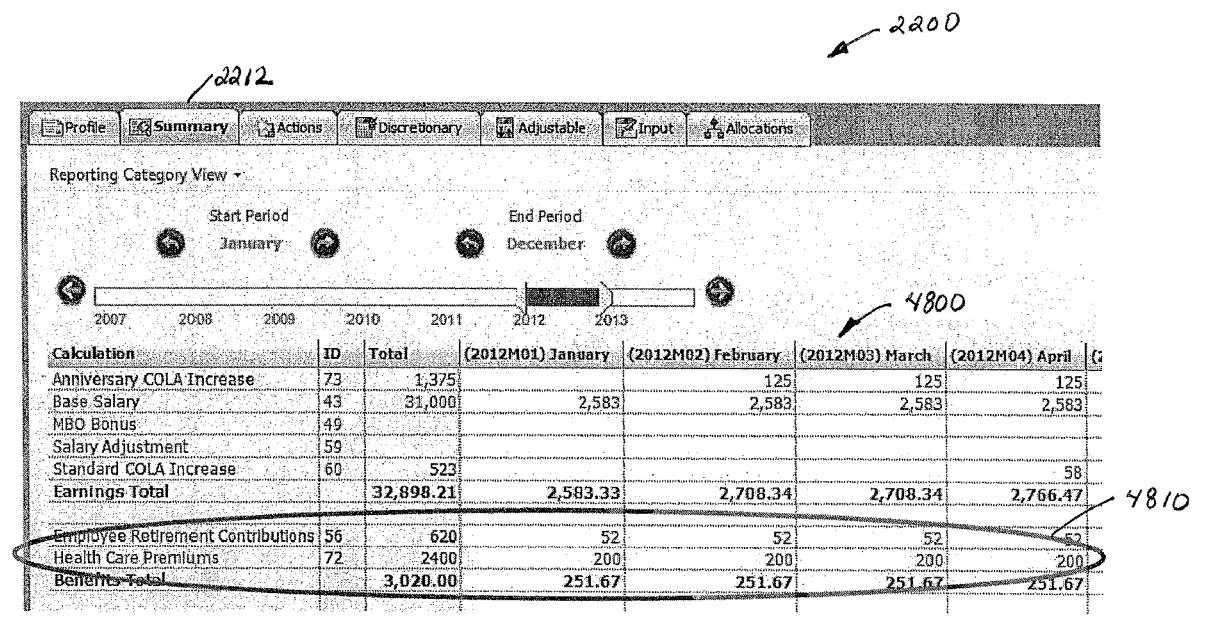

Reference is next made to FIG. 47, which shows the Edit Calculation screen 300 with a Calculation Details screen 4700 configured for a "Lookup" calculation type (FIG. 4). The Calculation Details screen 4700 is accessed using the Calculations Details tab 334. In this example, the Calculation Details screen 4700 is configured for calculating "Health Plan" Premiums, and the "Source Value" is Employee Attribute 4720 (i.e. of type list) "Health Plan" 4710. The Calculation Details screen 4700 is configured to allow a user to enter data in rows that correspond to the List Values of the Source Value parameter, and the columns correspond to the time periods of the Time Scope of the calculation, as indicated generally by reference 4730. According to another aspect, the calculation engine 122 (FIG. 1) is configured to display or render the results of the "Health Care Premiums" Lookup calculation, for example, as shown in the Summary screen 4800 for the Employee Editor screen 2200 in FIG. 48. In this example, the calculation engine 122 has calculated the "Health Care Premiums" by using the Health Plan Employee attribute to identify which row in the definition of the Health Plan Premiums calculation is to be used as the calculation result, as indicated generally by reference 4810.

According to the embodiments described above, the system comprises a graphical user interface that is configured to provide users with the functionality to define calculations and other operations associated with detailed planning for an entity. The system/GUI (and underlying or embedded logic and control) is configured (e.g. operating under software control) for generating a calculated time series based on scalar attributes for each entity and/or time series. For example in the context of personnel detailed planning, the system is configured to generate a time series of monthly salary amounts based on a monthly salary value for an employee, a date for a salary increase and/or the % of the increase. According to another aspect, the system/GUI is configured to provide users with the functionality to define calculations that manipulate time series for each entity. For example, in the context of personnel planning, the system is configured to generate monthly payroll taxes from monthly salary amounts for each employee in the organization. According to another aspect, the system/GUI is configured to provide users with the functionality to optionally flag calculation parameters as being "Adjustable", which allows users to adjust the parameter value for each entity being calculated. For example, in the context of personnel detailing planning, the system is configured to perform a calculation with a bonus of $1000, then making the calculation adjustable, allows the user to change and try different bonus amounts. According to another aspect, the system/GUI is configured to provide a user with the capability to optionally flag calculations as being "Discretionary", which means that a user can attach a calculation to each entity individually. For example, in the context of personnel detailing planning, the system is configured to provide a user with the capability to decide which employees are permitted to have mobile phone costs associated with them. According to another aspect, the system/GUI is configured to provide users with a pre-defined set of calculation types, for example, a "Spread" calculation that is configured to take an annual amount and spread the amount to months based on drivers defined using the GUI. The result of each calculation comprises a time series. Each pre-defined calculation comprises one or more set parameters. According to another aspect, the system/GUI is configured to provide users with the capability to define the calculation scope for a calculation and the conditional application to entities based on selected attributes of the entity. For example, in the context of personnel detailing planning, the system is configured to apply hourly rates to only hourly paid employees for salary calculations, or to apply Canadian pension calculations only to Canadian employees. It will be appreciated that this functionality provides the capability to define conditional sets of calculations, for example, a different tax rate for each province or state. According to another aspect, the system/GUI is configured to provide users with the capability to use the same name for multiple calculations, provided the scope of the calculations do not intersect. For example, the system is configured to execute multiple calculations for "Earnings". The system calculates "Earnings" for annually paid or salaried employees differently than "Earnings" for hourly paid employees. In this example, an employee cannot be both an hourly paid employee and a salaried employee. According another aspect, the common or same calculation can be used by the system as a parameter in a dependent calculation. For example, in the context of personnel detailing planning, the system can be configured to execute a "Payroll Taxes" calculation using the "Earnings" calculation as a parameter, even if there are multiple calculation definitions with the same name "Earnings".

The functionality and features associated with the processor or processing module 121 (FIG. 1), the calculation engine or module 122 (FIG. 1), and/or the server 120 (FIG. 1) and/or the client machines 110 (FIG. 1) and/or the graphical user interface (GUI) screens or windows 112 for the detailed planning system (FIGS. 2 to 50) as described above and in accordance with the embodiments may be implemented in the form of one or more software objects, components, or computer programs or program modules in the server and/or the client machines, and stored or embedded on a computer readable media, such as a disk, or other type of non-volatile memory or storage media. Further, at least some or all of the software objects, components or modules can be hard-coded into processing units, programmable devices, and/or read only memories or other non-volatile storage media in the mobile communication device, server and/or other components or modules depicted in the drawings. The specific implementation details of the software objects and/or program modules will be within the knowledge and understanding of one skilled in the art.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A system comprising:
    a memory that stores machine executable instructions; and
    one or more processors that access the memory and execute the machine readable instructions, the machine readable instructions comprising:
        an online analytical processing (OLAP) cube that stores a record for each of a plurality of employees, each of the records comprising time related numerical data values according to a predefined set of time values, and wherein each of the time-related numerical values is associated with a combination of one or more members belonging to one or more dimensions of the OLAP cube;
        a calculation engine that determines a cost for a plurality of employees over a given predetermined period of time based on data comprising detailed granular information extracted from the OLAP cube, the data including earnings data that characterizes a pay rate of each of the plurality of employees, a plurality of discretionary payments assigned to a subset of the plurality of employees, a tax rate for each of the plurality of employees, and dates within the given time period for a pay increase for associated employees and a percentage of increase for each of the associated employees at the dates, wherein a given subset of the plurality of employees are each assigned an hourly wage and another subset of the plurality of employees are each assigned an annual salary; and
        a graphical user interface (GUI) that:
            receives a first input from a user that includes a user selectable period of time based on the determined cost over the given time period, wherein the user selected period of time is less than the given time period;
            outputs a spread cost, generated via the calculation engine, for the plurality of employees in response to the first input from the user, wherein the spread cost represents a portion of the determined cost amortized over the given period of time;
            provides user controls for adjusting values of at least the pay rates for each of the plurality of employees and for editing the user controls;
            receives a second input from the user actuating the user controls, the second input including information adding a condition to the user controls; and
            automatically updates and outputs the user controls based on the second input, wherein the updated user controls includes the condition added as a selectable option.

2. The system of claim 1, wherein the given time period is one year, and the user selectable time period is one week.

3. The system of claim 1, wherein the given time period is one year, and the user selectable time period is one month.

4. The system of claim 1, wherein the given time period is one year, and the user selectable time period is one hour.

5. The system of claim 1, wherein the tax rate varies as a function of a state of residence for each of the plurality of employees.

6. The system of claim 1, wherein the GUI provides outputs data characterizing a total amount of payroll taxes for the plurality of employees.

7. The system of claim 1, wherein the determined cost is further based on a plurality of bonus payments assigned to a subset of the plurality of employees.

8. The system of claim 1, wherein a given subset of the plurality of employees are each assigned an hourly wage and another subset of the plurality of employees are each assigned an annual salary.

9. The system of claim 1, wherein the determined cost is further based on a pension cost for at least one of the plurality of employees.

10. The system of claim 1, further comprising a database that stores information for each of the plurality of employees, wherein at least two of the employees have the same name.

11. A non-transitory machine readable medium having instructions for performing a method, the method comprising:
    storing a record for each of a plurality of employees, each of the records comprising time related numerical data values according to a predefined set of time values, and wherein each of the time-related numerical values is associated with a combination of one or more members belonging to one or more dimensions of the OLAP cube;
    determining a cost for a plurality of employees over a given predetermined period of time based on data comprising detailed granular information extracted from the OLAP cube, the data including earnings data that characterizes a pay rate of each of the plurality of employees, a plurality of discretionary payments assigned to a subset of the plurality of employees, a tax rate for each of the plurality of employees dates within the given time period for a pay increase for associated employees and a percentage of increase for each of the associated employees at the dates, wherein a given subset of the plurality of employees are each assigned an hourly wage and another subset of the plurality of employees are each assigned an annual salary;
    receiving, via a graphical user interface (GUI), a first input from a user that includes a user selectable period of time based on the determined cost over the given predetermined period of time period, wherein the user selected period of time is less than the given time period;
    outputting a spread cost, generated via the calculation engine, for the plurality of employees in response to the first input the user, wherein the spread cost represents a portion of the determined cost amortized over the given time period;
    providing, via the GUI, user controls for adjusting values of at least the pay rates for each of the plurality of employees and for editing the user controls;

receiving a second input from the user actuating the user controls, the second input including information for editing the user controls by adding a condition to the user controls; and automatically updating and outputting the user controls based on the second input, wherein the updated user controls include the condition added as a selectable option.

12. The medium of claim 11, wherein the given time period is one year, and the user selectable time period is one week.

13. The medium of claim 11, wherein the determined cost is further based on a plurality of bonus payments assigned to a subset of the plurality of employees and a plurality of discretionary payments assigned to a subset of the plurality of employees.

14. The medium of claim 11, wherein the determine cost is further based on a tax rate for each of the plurality of employees.

15. The medium of claim 11, wherein the tax rate varies as a function of a state of residence for each of the plurality of employees.

16. A method comprising:

storing a record for each of a plurality of employees, each of the records comprising time related numerical data values according to a predefined set of time values, and wherein each of the time-related numerical values is associated with a combination of one or more members belonging to one or more dimensions of the OLAP cube;

determining a cost for a plurality of employees over a given predetermined period of time based on data comprising detailed granular information extracted from the OLAP cube, the detailed data including employee data, the employee data, the employee data comprising:

earnings information that characterizes a pay rate of each of the plurality of employees, dates within the given time period for a pay increase for associated employees and a percentage of increase for each of the employees at the dates, wherein the pay rate for a given set of the plurality of employees is an hourly wage and the pay rate for another set of the plurality of employees in an annual salary;

a tax rate for each of the plurality of employees;

a bonus payment for at least one of the plurality of employees; and a plurality of discretionary payments assigned to a subset of the plurality of employees;

receiving, via a graphical user interface (GUI), a first input from a user that includes a user selectable period of time based on the determined cost over the given predetermined period of time period, wherein the user selected period of time is less than the given time period;

generating and outputting a spread cost for the plurality of employees in response to the first input from the user, wherein the spread cost represents a portion of the determined cost amortized over the given time period;

providing, via the GUI, user controls for adjusting values of at least the pay rates for each of the plurality of employees and for editing the user controls;

receiving a second input from the user actuating the user controls, the second input including information for editing the user controls by adding a condition to the user controls; and automatically updating and outputting the user controls based on the second input, wherein the updated user controls include the condition added as a selectable option.

17. The system of claim 1, wherein the added condition of the updated user controls is configured to accept user input as mathematical operators.

\* \* \* \* \*